(12) United States Patent
Pilla et al.

(10) Patent No.: US 11,745,399 B2
(45) Date of Patent: Sep. 5, 2023

(54) SYSTEM AND METHOD FOR PRODUCING MULTI-MATERIAL HYBRIDS WITH A FOAM STRUCTURE

(71) Applicant: Clemson University, Clemson, SC (US)

(72) Inventors: Srikanth Pilla, Clemson, SC (US); Saeed Farahani, Clemson, SC (US)

(73) Assignee: Clemson University, Clemson, SC (US)

( * ) Notice: Subject to any disclaimer, the term of this patent is extended or adjusted under 35 U.S.C. 154(b) by 30 days.

(21) Appl. No.: 17/064,816

(22) Filed: Oct. 7, 2020

(65) Prior Publication Data

US 2021/0101322 A1     Apr. 8, 2021

Related U.S. Application Data

(60) Provisional application No. 62/912,257, filed on Oct. 8, 2019.

(51) Int. Cl.
*B29C 44/58* (2006.01)
*B29C 44/12* (2006.01)
(Continued)

(52) U.S. Cl.
CPC .......... *B29C 44/58* (2013.01); *B29C 44/1271* (2013.01); *B29K 2105/04* (2013.01); *B29K 2705/00* (2013.01)

(58) Field of Classification Search
CPC ... B29C 44/1271; B29C 51/20; B29C 51/087; B29C 44/3496; B29C 44/348; B29C 44/3453; B29C 44/321; B29C 44/32; B29C 44/16; B29C 44/148; B29C 44/129; B29C 44/1276; B29C 44/1233; B29C 44/12; B29C 44/083; B29C 44/08; B29C 44/065;
(Continued)

(56) References Cited

U.S. PATENT DOCUMENTS 3,887,312 A * 6/1975 Seary ...................... B29C 45/64
425/562
5,785,910 A * 7/1998 Sakashita .............. B29C 31/041
425/111
(Continued)

FOREIGN PATENT DOCUMENTS

JP          2007160736       *   6/2007

*Primary Examiner* — Stella K Yi
(74) *Attorney, Agent, or Firm* — Kim and Lahey Law Firm, LLC; Douglas W. Kim; B. C. Killough

(57) ABSTRACT

This system and method provide for manufacturing a multi-material hybrid structure comprising a single- or multi-layer sheet or tube, which are made of metals, fabrics, polymer and their combinations, and at least one layer or body made of formed resin. The methods include a simultaneous forming-injection process that followed with an additional sequence to initiate the forming process along with curing and/or solidification and/or bonding processes. The additional sequence provides a pressure drop inside the cavity using tool movement and or additional deformation of one/or several layers of the sheet using any fluid pressure, suction and/or electromagnetic force. The injection process can be used for any kind of synthetic or bio-based resin with or without fiber reinforcement. It is also integrated with supercritical assisted technology.

16 Claims, 17 Drawing Sheets

(51) Int. Cl.
  *B29K 705/00*   (2006.01)
  *B29K 105/04*   (2006.01)
(58) Field of Classification Search
  CPC . B29C 44/06; B29C 44/0453; B29C 44/0415; B29C 44/027; B29C 44/025; B29C 44/586; B29C 44/585; B29C 44/58
  See application file for complete search history.

(56) References Cited

U.S. PATENT DOCUMENTS

2017/0080621 A1* 3/2017 Kikumori ........... B29C 45/7653
2018/0321659 A1* 11/2018 Dasappa ............... B29C 64/118

* cited by examiner

SYSTEM AND METHOD FOR PRODUCING MULTI-MATERIAL HYBRIDS WITH A FOAM STRUCTURE

REFERENCE OT RELATED APPLICATIONS

This application claims priority from U.S. Provisional Patent Application Ser. No. 62/912,257 filed Oct. 8, 2019 titled System And Method For Producing Multi-Material Hybrids With A Foam Structure incorporated by reference.

BACKGROUND OF THE INVENTION

(1) Field of the Invention

The invention relates to a method for producing a multi-material hybrid structure comprising one or more layers of deformed sheets totally or partly covered and affixed to a polymeric body.

(2) Description of Related Art

Multi-material and multi-functional sandwich structures can provide superior properties such as high bending inertia, sound and heat insulation, and high energy absorption while demonstrating additional functionalities, such as sensing, actuating, energy harvesting, self-healing, and health monitoring. These structures can be beneficial for aerospace, automotive, manufactured components, and products. Conventionally, three-dimensional sandwich structures are produced either through a multi-stage manufacturing process or by forming a prelaminated blank. The multi-stage manufacturing processes are not efficient enough for mass production. The use of prelaminated blanks has limited the forming geometry due to excessive shear tension and interlayer delamination.

Sandwich structures, particularly three-dimensional ("3D") constructions with non-flat, complex geometries, are conventionally produced either through a multi-stage manufacturing process or by forming a prelaminated blank. In this first traditional approach, the core and the facings are manufactured separately, then bonded together in the third operation using adhesives or other joining techniques. This method is not affordable due to its high production cost and requires an extensive effort to handle the combined complexity of the incorporated phenomena such as springback, shrinkage and adhesive curing dynamics. Further, these additional functionalities require embedding parasitic parts such as sensors, optical fibers and bulky connectors, which significantly undermined the rigidity and mechanical properties of the final component. The second manufacturing approach, however, while more reliable with less complexity in some cases, results in a forming geometry of the prelaminated blank that is limited due to excessive shear tension and interlayer delamination. There is insufficient flexibility in the production of the prelaminated blank to handle the complexity of integrating multiple functionalities into the final sandwich structure.

Generally, a method and an apparatus of the generic type are known from international patent publication WO 03/057446 A1 (PCT/NL03/000016). This method, which has been referred to as Polymer Injection Forming (PIF), starts with placing the sheet blank in the injection mold using designated grips. The two halves of the mold are closed which results in application of a blank holder force. The polymer melt is injected into the feeding system and other free spaces; considered as the initial filling stage. After the initial filling, the polymer tends to deform the sheet metal and squeeze into the newly developed space. Therefore, the polymer melt serves as a forming medium and the filling phase turns to coupled filling/forming condition. In this stage, the sheet metal begins to undergo free deformation until it gets in contact with the cavity wall; the beginning of the shape forming. Simultaneously, solidification of the polymer melt also occurs. Subsequent to the expiration of the cooling time, the mold halves are opened, and both the molded polymeric part and the deformed sheet metal are removed from the mold either separately or as a unified hybrid component, depending upon the presence/use of the bonding agent. The bonding between metal and polymer can be attained by direct bonding, surface treatment, mechanical interlock or adhesive coating.

PIF can improve the production process by reducing the cycle time and widening the manufacturing tolerances while facilitating easy assembly via embedding several functionality features into a single product. Only one set of tools and machinery is needed in PIF, thus reducing capital cost. While the PIF process as an integrated manufacturing process provides several advantages and new opportunities for manufacturing hybrid components, there are several disadvantages that hinder the actual industrial applications of this method.

For example, a deep forming of the metal blank alone through the polymer melt pressure results in a thick layer of polymer in that area. This thick layer of polymer is not desired, as it can cause several issues such as increasing the weight of the part, increasing cooling time, possibility of warpage and local excessive shrinkage or sink mark. These negative results produce disadvantages in this current method.

Forming the sheet via tool movement prior to injection and then creating the final shape by injecting a thin layer of polymer has been introduced as an alternative to prevent thick polymeric parts. The passage of polymer melt through a thin channel increases the pressure loss along the flow path. However, the pressure loss along the flow path from the machine nozzle and within the cavity is usually normal in injection molding process due to shear-rate, and temperature-dependent viscous behavior of polymer melt. In the PIF process, this excessive pressure loss causes a non-uniform pressure distribution and consequently non-uniform deformation resulting in disadvantages to this method.

During the injection process and afterward, the solidification of the melt takes place and consequently becomes smaller in size. This phenomenon is referred to as the shrinkage and its effect can be noticeable depending upon the material composition and processing parameters. There is also the challenge of the sheet material forming processes including an elastic recovery which is known as springback. It is generally defined as the geometric change of sheet metal parts after the loading is removed due to the action of residual stresses and thereby affects the dimensional accuracy of a deformed part. Shrinkage and springback play opposite roles in the PIF process, inducing significant stresses on the contact area that in turn reduces the bonding layer strength and leads to the delamination of sheet layers from the polymeric part.

Supercritical Fluid-assisted (Sc.F.) injection-molding technology is an injection molding technology that is generally shown in U.S. Pat. No. 5,158,986. In this process, $CO_2$ or $N_2$ in a supercritical state are mixed with the molten polymer inside the barrel of the injection machine to create a single-phase solution of polymer melt with supersaturated Sc.F. This solution is then injected into the mold cavity at atmospheric pressure (e.g. below the gas saturation pressure point), which can trigger a thermodynamic instability that initiates cell nucleation, thereby creation of a foam structure in the polymer. This forming process can be controlled to achieve a microcellular structure with superior characterizations. There are several benefits associated with the Sc.F. assisted technology such as weight reduction, less shrinkage, lower pressure loss and better dimensional stability that shows the capabilities of this technology in significantly reducing manufacturing costs compared to conventional injection molding processes.

In conventional Sc.F. assisted injection molding, there have been several techniques to control both the pressure drop and the drop rate. The simplest one is the configuration of both the shot volume and the injection rate to maintain the required pressure drop and drop rate for cell nucleation. As this technique is not adequate for all processing conditions to create uniform cell distribution and to obtain desired surface condition, other techniques such as gas counterpressure have been developed to control the forming process and improve the surface quality. All the aforementioned methods may prove ineffective with SFPIF process given the absence of free space within the cavity (except within the feeding system, which is quite small compared to the entire shot volume). Indeed, the deformation of the sheet metal causes the creation of this cavity space during the coupled filling/forming phase. Thus, in SFPIF, both the pressure drop and drop rate cannot adequately be controlled only by shot volume and injection rate as they are also dependent upon the material and thickness of the blank, the level of deformation, and the geometry of the final deformed part.

Therefore, it is an object of the present system and method to provide for monitoring and controlling the integration of Sc.F. assisted injection molding technology with the PIF process, e.g. create a process that will be referred to as SFPIF herein.

It is another object of this system and method to introduce techniques, devices and instrumentations to control the pressure drop and drop rate considering the coupled filling/forming phase and deformation of the sheet blank as a part of the cavity.

SUMMARY OF THE INVENTION

This system and method, in comparison with the conventional multi-stage manufacturing procedures for fabricating hybrid components, can reduce cycle time, capital cost, operational cost, provide tight tolerance, and improve production planning, thereby increasing the return on investment. Moreover, this system and method can overcome the practical issues that hindered the industrial application of the previous integrated processes such as Polymer Injection Forming (PIF). This system and method have application in many industries including automotive related applications such as in the manufacturing of body, interior trims, chassis, structural parts, and electronic enclosures. Similarly, the application of this system and method can be expanded to aerospace, home appliance, electronic consumer, construction and housebuilding sectors. Moreover, this system and method can be used in the manufacturing of the battery including the case and/or whole structure as a hybrid component.

This system and method for producing a hybrid structure comprising: placing an initial sheet (tube blank) between dies in pair wherein a first plate (fixed) includes a feeding system and a second plate (mobile) includes a cavity; moving the second plate toward the first plate to clamp, cut and/or pre-form the initial sheet; heating a resin and mixing the resin with a supercritical fluid to produce a single-phase resin solution; injecting the single-phase resin solution into a feeding system; forming using one of the processes in the group consisting of (a) adjusting a forming pressure according to a cavity pressure and a forming pressure, (b) opening a mold after a filling/forming sequence, maintaining a blank holder force, and (c) deforming (e.g. hydraulic pressure or electromagnetic) the plate after the filling/forming sequence, sensing physical characteristics in the mold during a SFPIF process; and, receiving and analyzing inputs from a melt or mold temperature measuring device representative of the cooling condition of a cavity and sending outputs to an injection machine or cooling system to adjust the cooling condition in the range so that a desired morphology is achievable.

The system and method can include producing a multi-material hybrid structure comprising: providing a blank; providing a mold having a fixed plate, a mobile plate, a floating plate, a cavity defined in the mobile plate and a sprue defined in the fixed plate; placing the blank between the fixed plate and mobile plate; deforming the blank by moving the mobile plate toward the fixed plate; injecting a resin into the spruce at an injection pressure to further deform the blank by forcing the blank into the cavity; reducing the injection pressure to create a first set of voids in the resin and a foamed layer affixed to the blank; and, applying a blank holder force against the blank while opening the mold a first distance to create a second set of voids in the resin.

The system and method can include injecting resin having a fluid in a supercritical state to provide a foaming agent, reducing the injection pressure according to a pressure sensor carried by the fixed plate, applying a blank holder force according to a pressure sensor carried by the fixed plate, providing a mold having a slider carried by the mobile plate and moving the slider away from the fixed plate to further deform the blank and cause nucleation of voids in the resin, and injecting a pressurized fluid into the cavity at a first pressure to support the blank and reducing the injection pressure of the pressurized fluid to a second pressure to cause nucleation of void in the resin.

The system and method can include a first deforming of the blank and a second deforming of the blank occurring using an electromagnetic coil included in the mold. The blank can be made from additive manufacturing. A spacer core can be included in the blank made from a process taken from the group consisting of additive manufacturing, deep drawings, injection molding and any combination thereof. The blank can include a facing affixed to with an adhesive layer including a thermally activated adhesive layer. The blank can have an interlayer and resin can be injected into the interlayer. The mold can include a bridge to control a height of the interlayer.

The system and method can include expanding a volume of the cavity after injecting the resin. This process can cause nucleation of voids (e.g. bubbles) in the resin. The system and method can deform the blank by moving the mobile plate toward the fixed plate in a first deforming then moving the mobile plate away from the fixed plate resulting in a second deformation of the blank.

The system for producing a multi-material hybrid structure comprising can include a mold; a blank received onto the mold; a fixed plate configured to contact a first position of the blank, deform the blank and receive resin mixed with a supercritical fluid, and position the resin between the blank and the fixed plate; a mobile plate configured to contact a second portion of the blank, deform the blank into a cavity defined in the mobile plate, open to a first position causing nucleation of voids in the resin; and opening to a second position to release the blank and resin affixed to the blank; and, a blank holder included in the mold configured to apply force against the blank during the mobile plate opening to the first position. The system can include a fixed plate configured to contact a first position of the blank, deform the blank and affix a resin to the blank; a mobile plate configured to contact a second portion of the blank, deform the blank into a cavity defined in the mobile plate, open to a first position causing nucleation of voids in the resin; and, a blank holder included in the mold configured to apply force against the blank during the mobile plate opening to the first position.

DESCRIPTION OF THE DRAWINGS

The invention will be more readily understood with reference to the following drawings.

DETAILED DESCRIPTION

Figure 1:
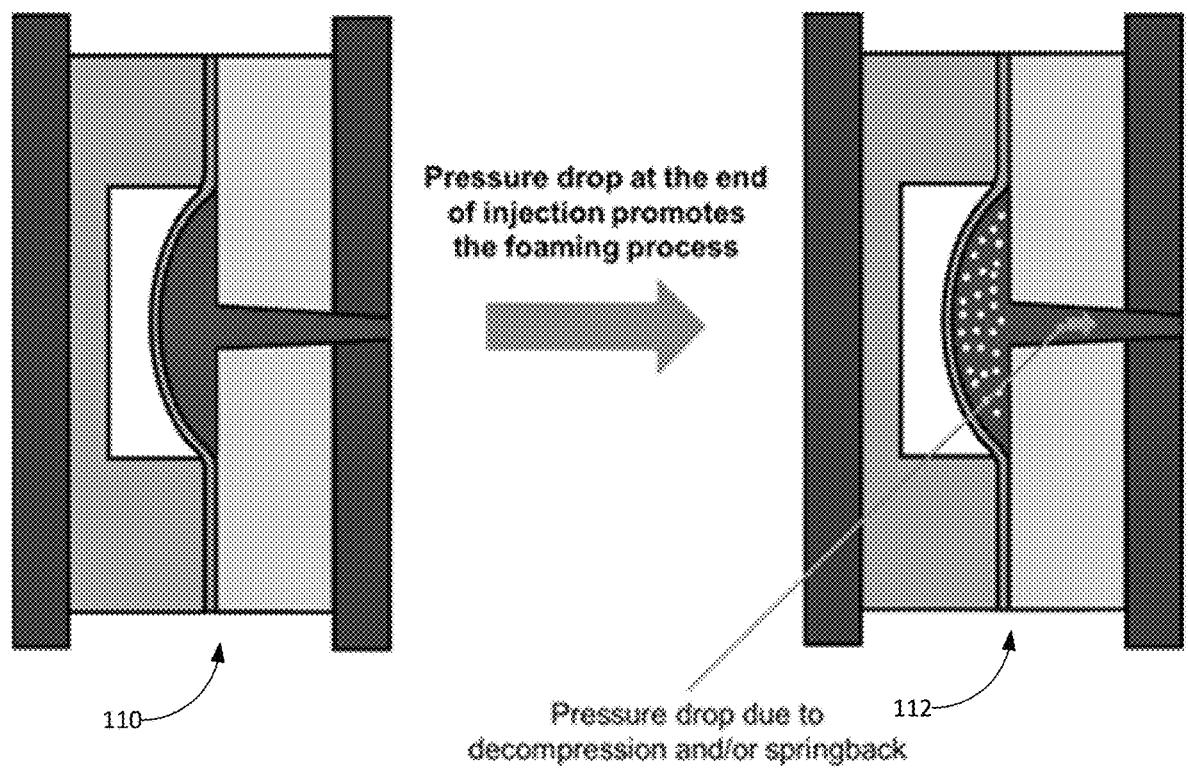
FIG. 1 is a schematic of aspects of the invention.

According to the present invention, a system and method of manufacturing a multi-material hybrid structure comprising a sheet or tube and at least a layer or a body of foamed resin includes a forming process, an Sc.F. assisted injection molding process and an additional operation to initiate and control the forming process.

This system and method to combine PIF with Sc.F. assisted injection technology results in a synergy when integrating these two processes. Advantages can be produced when combining PIF with Sc.F. technology including balancing and maintaining the lightweight condition while eliminating the issues related to thick polymeric layer, due to the nature of the forming process. This combined PIF with Sc.F. injection molding process can mitigate prior disadvantages because the dissolution of the Sc.F. into the melt reduces viscosity significantly, and thus improves deformation uniformity. It is possible to reduce the residual stress and geometrical instability caused by opposing effects of springback and shrinkage via integrating the PIF with Sc.F. injection molding. This system can cause a polymer to melt with the dissolved Sc.F. resulting in expansion rather than shrinkage, which provides a reduction of elimination of shrinkage. Moreover, damping characteristic of hybrid components can be improved by attaching a foam polymeric layer to a stiff sheet part made of metals or composites. A desirable tactile feeling can be attained by attaching a soft foamed polymeric layer on the surface of the interior parts. This thick soft foamed layer with cushioning characteristics on the surface can also improve safety for passengers in transportation applications.

After the creation of the single-phase solution of the polymer melt and Sc.F. during the plasticizing stage, cell nucleation and growth next occurs during the injection into the mold cavity. This system and method can create enough nuclei to develop a proper microcellular structure within the final injected part. Improving the creation of sufficient cell nucleation within the conventional Sc.F. assisted injection molding process can be characterized through control of the pressure drop and drop rate within the mold cavity, given their direct influence upon the cell morphology.

The sheet or tube can be single- or multi-layer, which is, hereinafter, referred to merely as a sheet blank or tube blank. The sheet or tube material is not limited but preferably can be a metal, polymer, composite, fabric and any combination of them. The metal sheet or tube can, for example, be made of steel, stainless steel, high strength steel, TWIP steel, galvanized steel and alloys based on aluminum, magnesium, copper, brass, bronze, silver, gold, titanium. The polymeric sheet or tube is produced in a separated process and it can be from all kinds of polymeric material, preferably from those materials suitable for sheet production such as polypropylene, polyethylene, polycarbonate, nylon and the like. The composite sheet or tube can be made of any combination of the resins and reinforcement such as prepreg sheets with thermoplastic or thermoset matrix. The fabric material sheet includes all kinds of sheets composed of fiber, paper, or cloth, such as woven fabric, non-woven fabric, knitting fabric and the like. Fibers can be natural fibers, animal fibers, mineral fibers, inorganic fibers (metallic fibers, glass fibers, carbon fibers and others), Synthetic fibers (polyethylene, polypropylene, polyacrylonitrile, polyester, polyamide, polyvinyl chloride, polyurethane and others) and the like and their mixtures. The sheets or tube blanks that are subjected to deformation can totally or partially cover one side or two sides of the injected layer or body as a laminated or sandwich structure, respectively. It is also possible that the sheet or tube blank is placed in between the injected resin and plays as a core of the final hybrid part.

The resin as the injected material can be of thermoplastic resins such as polyethylene, polypropylene, polystyrene, ABS (acrylonitrile-butadiene-styrene), polycarbonate, polyamide and the like. The resin may be of homopolymer or copolymer or a polymer blend, and more preferably, include fillers such as talc, mica, bio-based or nature-derived filler and the like and materials for reinforcing such as glass fibers, carbon fibers, organic fibers and the like. The injected resin can also be of thermoset resin such as polyester, polyurethanes, polyurea/polyurethane, epoxy, benzoxazines, polyimides, liquid silicone rubber, Bismaleimides and the like compounded with any fillers or fibers. The injected resin can also be an elastomer and the like compounded with any fillers or fibers.

A fluid preferably nitrogen or carbon dioxide, in its supercritical state is added to the injected resin as the forming agent. The supercritical fluid is made at a relatively low temperature and a relatively high pressure. It is then injected into the injection machine barrel in a specific controllable amount to mix with and saturate the resin.

The present system and method can include four main processes: forming, injection, foaming, and bonding. However, in some embodiments of the invention, there can be a pre-operation such as preheating or surface treatment of the blank. For example, to enhance the formability and/or to partially or totally cure the material, the blank can be preheated to the proper temperature in a pre-operation process.

The forming process includes: placing an initial sheet or tube blank between dies in pair; the fixed one having a feeding system and the mobile one having a cavity; moving the mobile plate toward the other one to clamp and/or cut and/or pre-form the blank by the mean of tool movement or any other agents. In the Sc.F. assisted injection molding process, first, a resin is heated and melted, and a supercritical fluid is properly mixed with it to create a single-phase resin-Sc.F. solution. The weight percentage of the supercritical fluid is adjusted according to the desired weight, surface characteristic, and morphology of the final injected part. Once the mixture of molten resin and Sc.F. is properly processed, it is injected into the feeding system and other initial free spaces. After initial filling, the resin tends to deform the blank and squeeze into the newly developed space. Hence, the resin melt serves as a forming medium and the filling phase turns to coupled filling/forming condition. In this stage, the sheet or tube blank can first begin to undergo free deformation until it contacts with the cavity wall; this is the beginning of the shape forming. Due to the differences of the SFPIF and conventional Sc.F. assisted injection molding (mentioned in the background and motivation section), an additional operation is needed in this stage of the method to control the pressure drop and drop rate. In this invention, three major techniques are presented to control the pressure drop and drop rate as described below in detail.

In one embodiment, the resistance of the blank against the development of the melt flow can provide the same condition as the gas counter pressure method. If the cavity pressure caused by the resistance during the coupled filling/forming phase is less than the forming pressure of the resin, the profile of the injection rate is precisely adjusted to produce products with evenly distributed microscopic cells while simultaneously improving the surface appearance and shrinkage or warpage of the resulting products. But, if the resistance pressure is higher than the forming pressure of the resin, the forming process is suppressed. Therefore, the pressure drops at the end of the injection, which is caused due to the springback of the deformed blank and/or the decompression induced into the cavity by the plasticizing phase, which was used to initiate and control the forming process. In this embodiment, no additional action is carried out to control the pressure drop and drop rate thus the forming process is controlled by precisely adjusting the design, tool and/or process parameters. The embodiment is shown in FIG. 1 which is a schematic for forming. Coupled filling/forming sequence with full shot size is shown as 110 and pressure drop at the end of the injection phase promotes and controls the forming process is shown as 112.

Figure 2:
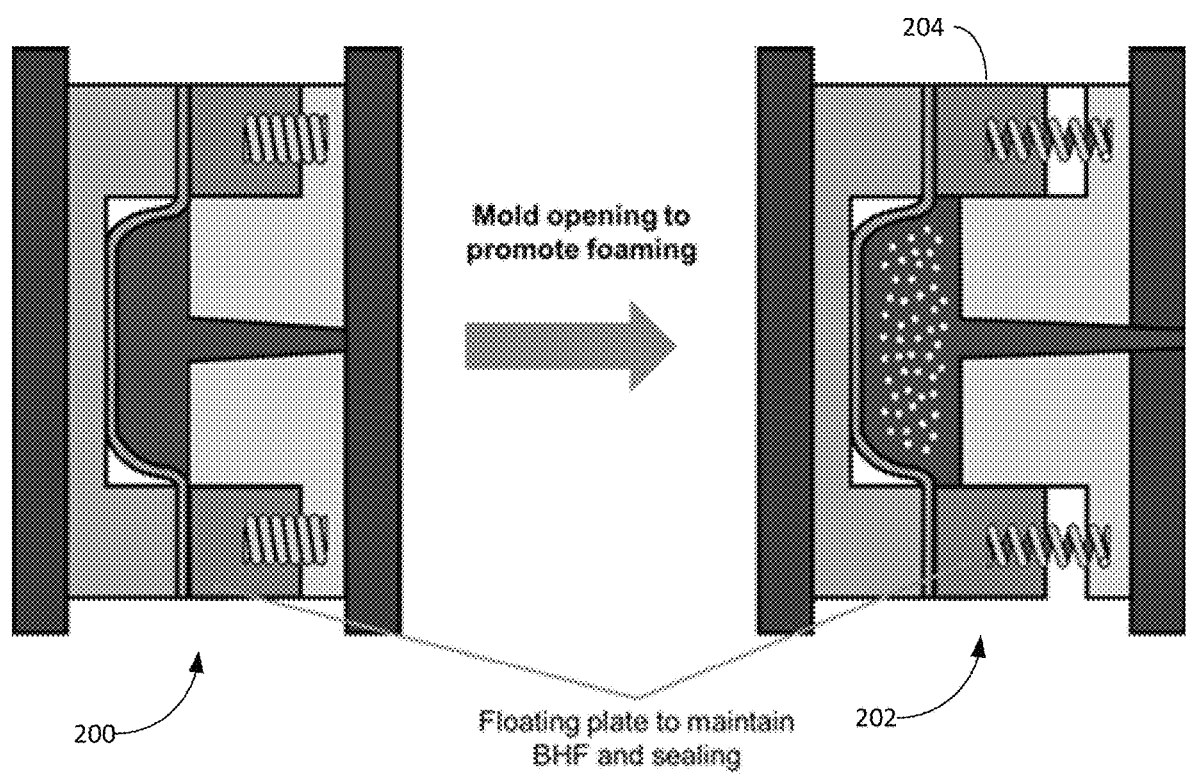
FIG. 2 is a schematic of aspects of the invention.

Referring to FIG. 2, another embodiment of the forming technique is shown. After the coupled filling/forming sequence is finished with the full shot size, the mold opens to give the forming space. The injection machine can be designed to be capable of opening the mold after injection and to also precisely control the opening distance. Moreover, a third floating plate 204 can be included for the mold to maintain the blank holder force (BHF) on the sheet blank and prevent resin flash after the mold is opened. The BHF can be provided by a set of springs or a set of hydraulic, pneumatic or electric actuators. In this technique, it is possible to control the pressure drop and drop rate by the amount and speed of the mold opening action. This technique can be combined with the aforementioned mechanism to achieve a higher level of the weight reduction and a more uniform foam structure due to its direct influence on the pressure drop and consequently more precise forming control. A coupled filling/forming sequence with full shot size is shown as 200 and the mold opens to give additional space and promote forming as shown as 202.

Figure 3:
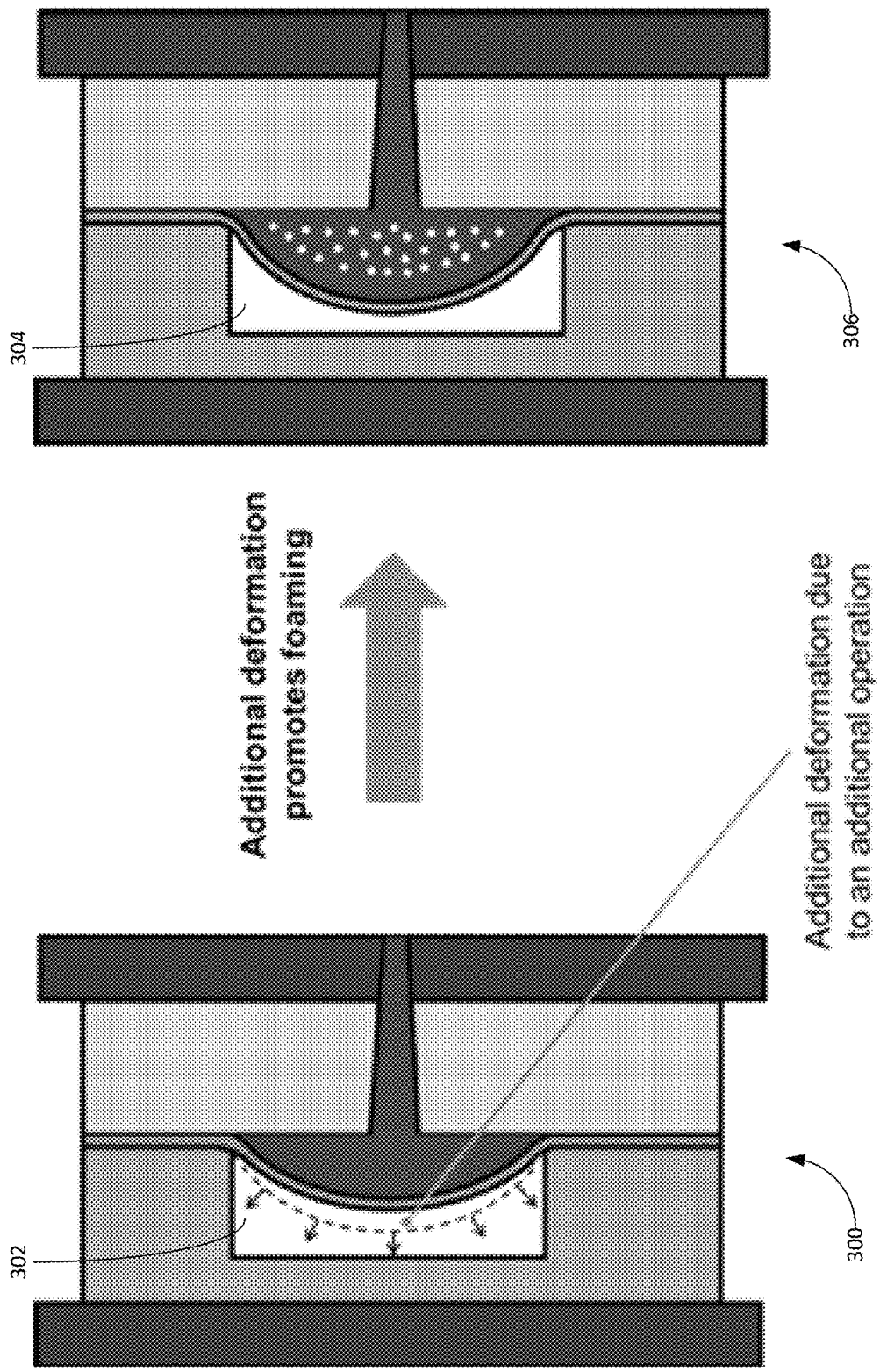
FIG. 3 is a schematic of aspects of the invention.

Referring to FIG. 3, another forming technique is shown. In this technique, after the coupled filling/forming sequence is finished, an additional deformation takes place on the blank to increase the cavity volume 302 thus resulting in pressure drop. This additional deformation can be created by tool movement, hydraulic pressure or electromagnetic force. This embodiment can provide for the design and process flexibility and extend the capability of the SFPIF. For example, the employment of the hydraulic pressure can provide a back pressure on the blank during the filling/forming stage, which makes several improvements on the deformation process similar to those are attained in hydroforming processes. In the case of integrating electromagnetic deformation with this process, it is possible to form the blank with higher deformation rates than the regular SFPIF. This feature makes the process suitable for strain rate sensitive material owing to their improved formability in high-speed deformation processes when the cell nucleation and growth get stabilized and solidification of the resin reaches to the desired level, subsequent to the expiration of the cooling time, the mold halves are opened, and both the molded polymeric part and the deformed blank are removed from the mold either separately or as a unified hybrid component, depending upon the presence/use of any bonding agents. The bonding between the deformed blank and polymer can be attained by direct bonding, special surface treatment on the initial blank, mechanical interlock or adhesive coating. Coupled filling/forming sequence with full shot size is shown as 300 and additional deformation gives space 304 for forming as shown as 306.

Figure 4:
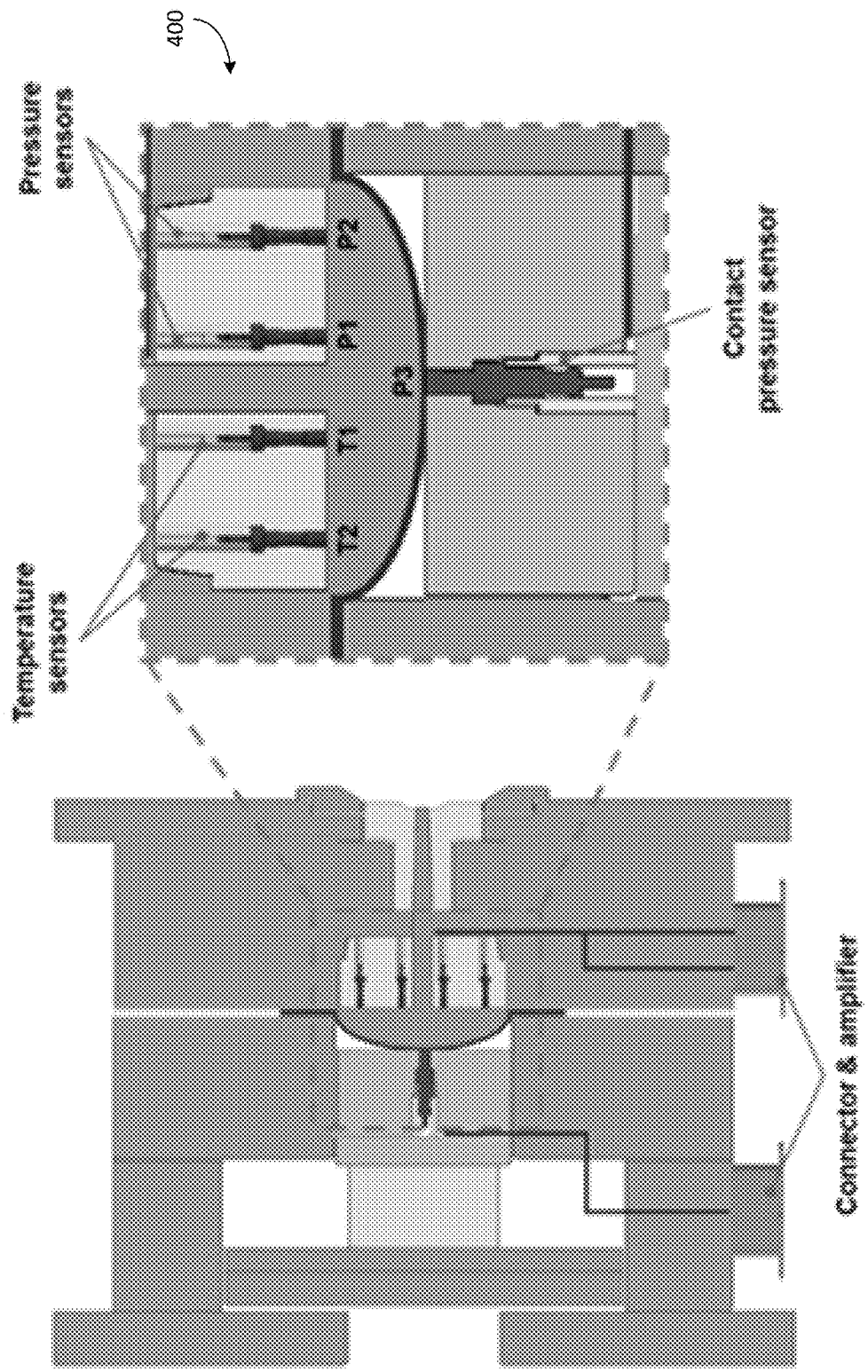
FIG. 4 is a schematic of aspects of the invention.
Figure 5:
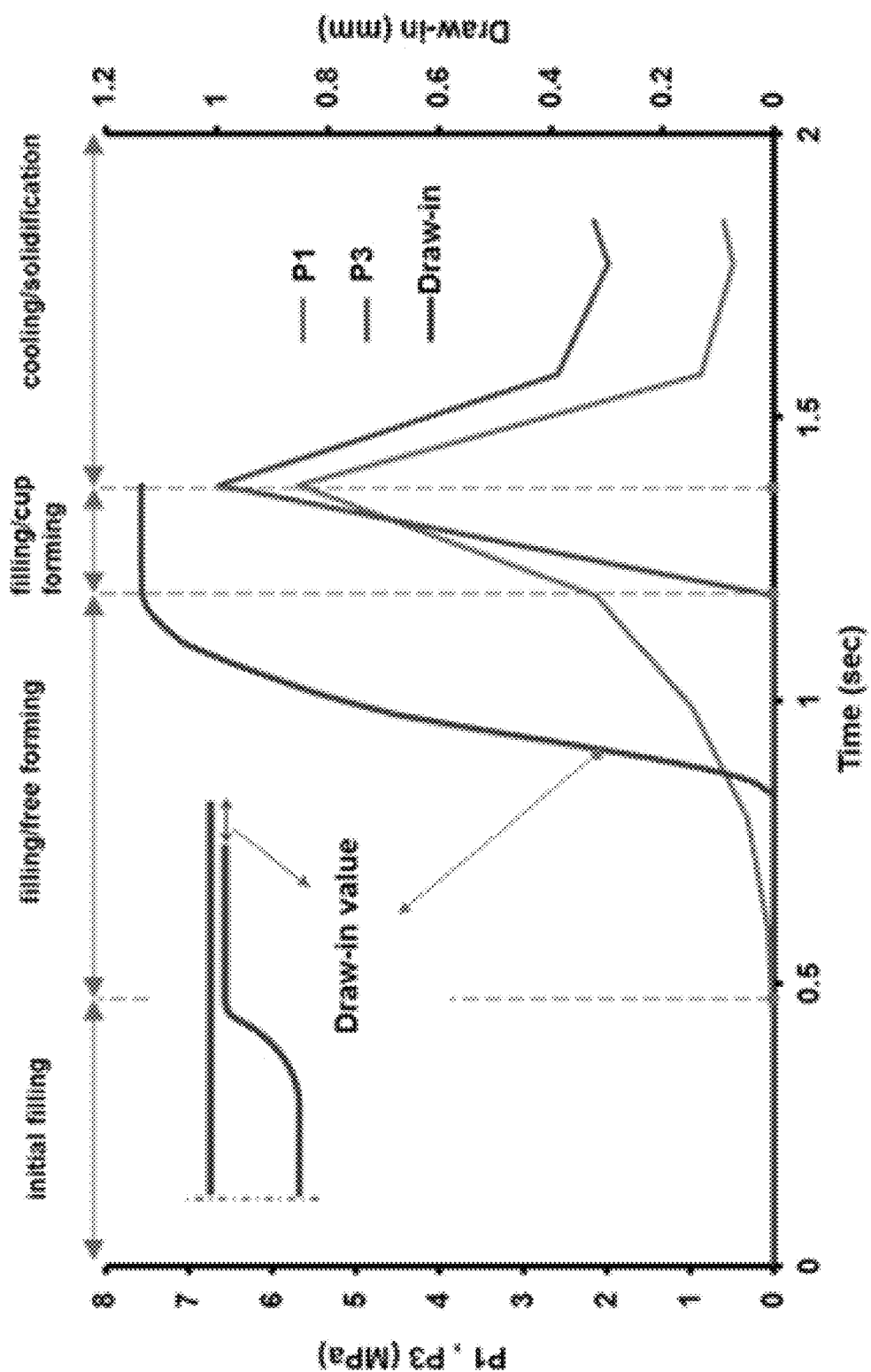
FIG. 5 is a graph of aspects of the invention.

Other aspects of the invention include the ability to monitor, control and eventually enhance, the SFPIF process under practical conditions. In order to achieve the foregoing object, a set of in-mold sensors 400 can be embedded into the mold. The schematic of an SFPIF mold and a detailed view of a possible configuration of the sensor are shown in FIG. 4. Thus, the present invention is not limited to the shown sensors or configuration of the sensors, and various types of sensors and their configurations may be appropriately utilized without departing from the scope of the present invention.

Referring to FIG. 4, a schematic of the SFPIF mold and a view of one embodiment of the sensors is shown. In the embodiment of FIG. 4, two pressure and two temperature sensors are embedded in the post-gate position (P1, T1) and a position near to the end of the cavity (P2, T2), to measure the cavity pressure and temperature and their gradients along the flow path. Such a determination of the pressure can be used to determine the melt flow model and determine the pressure loss during the flow path. The role of the temperature sensors (T1 and T2) is to monitor the mold temperature and its distribution on the cavity wall as they are placed in the cavity at the symmetric position to the pressure sensors. There can be another pressure sensor at the center of the bottom of the cavity (P3) to capture the contact pressure applied from the sheet blank during the deformation. The sensors' signals are then amplified and transferred to a data acquisition unit, which is responsible for online recording and processing of the sensor signal.

Given the configuration of the sensors, one aspect of the invention can be to focus on providing information indicative of instantaneously occurring conditions that occur in the SFPIF process that may be used to control subsequent operations in the same or other cycles.

Figure 6:
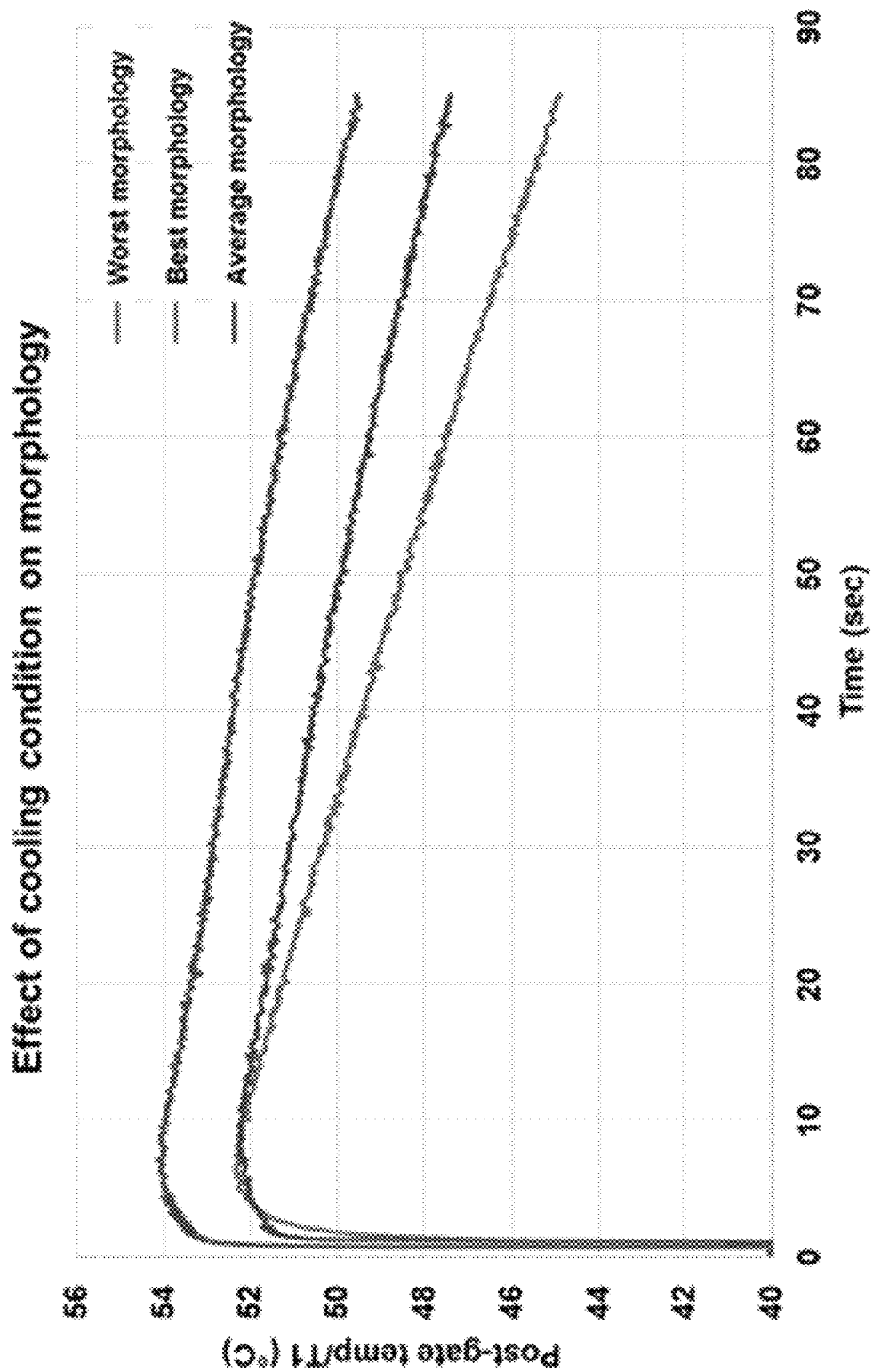
FIG. 6 is a graph of aspects of the invention.

For example, if the amount of the sheet blank drawn into the mold cavity (draw-in value) is plotted versus the processing time and then superimposed with the pressure profiles captured by the sensors located at positions P1 and P3, a graph similar to the one that is shown in FIG. 6 can be obtained. This graph illustrates superimposition of the draw-in value determined from simulation on the pressure profile captured by sensors P1 and P3.

The role of the P1 sensor in this superposition is that of showing the beginning and the end of the deformation as embedded at the post gate location for purposes of capturing the resin pressure immediately upon entrance to the cavity. The sensor P3 is embedded at the bottom of the cavity, at the precise center and in front of the gate location, to thus precisely capture the moment in which the deformed sheet makes contact with the cavity bottom, as indicated in the graphs at the end of the free forming stage. By synchronizing and drawing P1, P3 and the draw-in value regarding the processing time in the same graph, it is possible to elucidate the evolution of the draw-in value through the four stages of the process: initial filling, filling/free forming, filling/shape forming, and cooling/solidification. This superimposition reveals that the drawing of the sheet into the cavity mostly happens during the early deformation stage (i.e. free forming) whereas the wrinkling and flashing occur when the sheet makes contact with the cavity walls (i.e. shape forming) and subsequently, a higher pressure is required to be applied on the sheet to get the shape of the cavity. This fact indicates the importance of providing a sensor on the side of the sheet to capture the end of the free forming stage and using this signal to control the blank holder force (BHF) during the injection stage. Therefore, the reduction of the BHF at the initial stage will allow enough drawing of the sheet to make the thickness reduction more uniform and to eventually prevent rupture.

After the end of the free forming stage, an increase in BHF will thus prevent the occurrence of both wrinkling and flashing issues. Overall, precise detection of the moment that represents the end of the free forming stage and using this moment to control and regulate the BHF is a desirable aspect of this system and method. Hence, this can be done quite simply with only one sensor at the proper position to capture the end of the free forming stage, and the results of the other sensors and value of the draw-in have been presented in the figure only for elucidation of the invention. In some embodiments, the regulation of BHF may be performed simply with the signals captured from the injection molding equipment with no aid of in-mold instrumentation. For example, the end of the free forming stage can be captured by monitoring the barrel pressure or clamping force in the injection machine itself.

One benefit from this system and method is to provide for in-mold instrumentations and/or injection machine data to control the forming process within SFPIF process. The benefit can be achieved by monitoring the online process variables within the cavity and injection machine during the SFPIF process.

For example, to find any correlation between the cooling condition within the cavity and the morphology of the final injected part, the temperature of the sensor embedded within the cavity (for example, in this case, the post-gate temperature sensor, T1, can be used) can be carefully monitored for each experiment, an example of this result is shown in FIG. 6 for three different processing conditions. The temperature plotted in green represents samples with the best cell morphology in respect to highest cell density and lowest average cell size while that in red and purple denotes the worst and average cell morphologies, respectively. Note the best morphology was achieved in the experiment with the fastest cooling condition (the green one) whereas the most gradual cooling condition resulted in the experiments characterized as the worst morphology. Therefore, the invention further includes a control system capable of receiving and analyzing inputs from a melt or mold temperature measuring device representative of the cooling condition of the cavity and sending outputs to the injection machine or cooling system to adjust the cooling condition in the range that a desired morphology is achievable. FIG. 6 profiles associated with postgate temperature sensors for three different cooling conditions.

Figure 7:
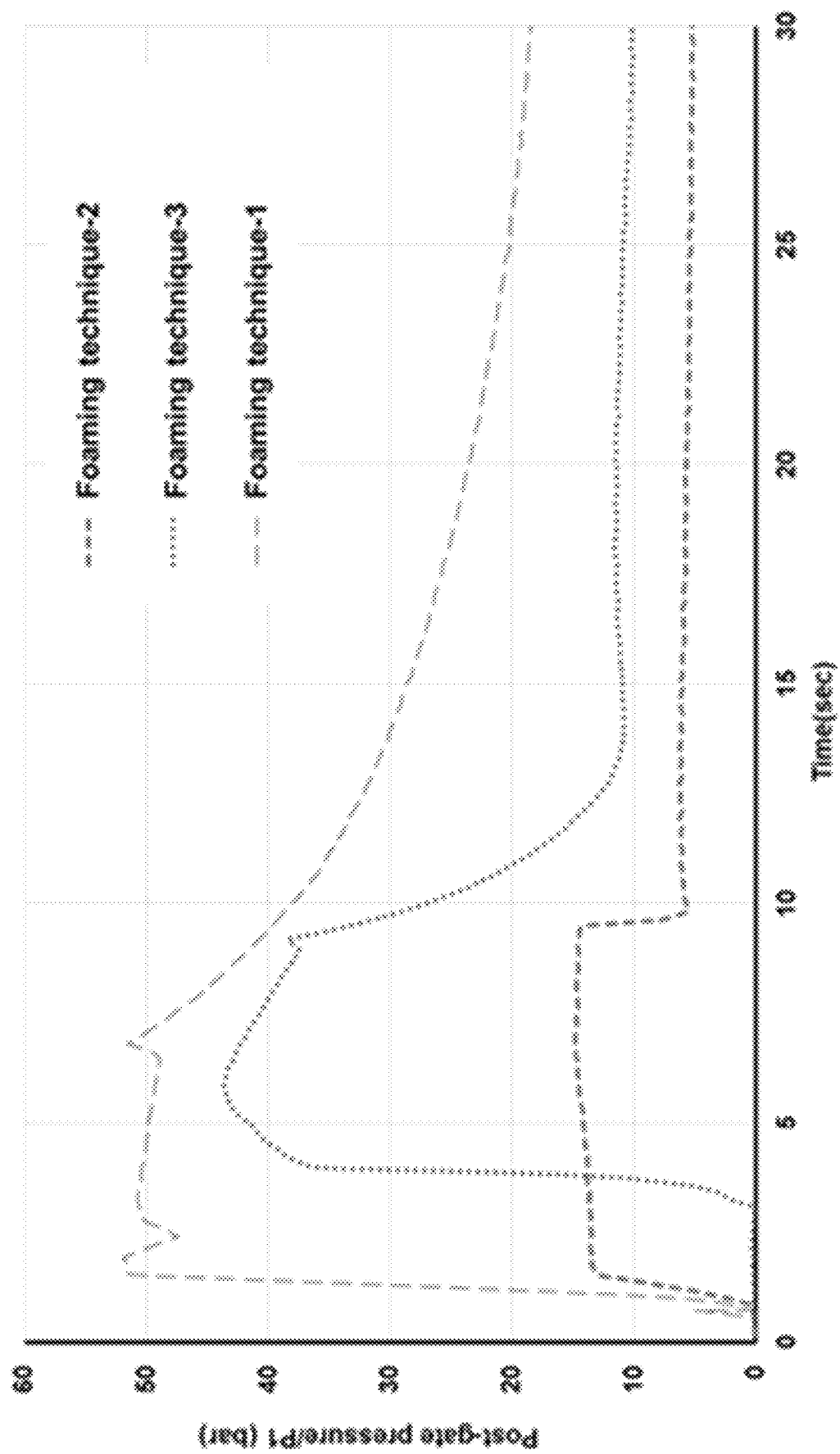
FIG. 7 is a graph of aspects of the invention.

Cavity pressure can affect the performance of the SCPIF process in terms of the deformation, the weight of the injected part, shrinkage and cell forming quality. Hence, an example of the cavity pressure captured by the post-gate sensor (P1) is shown in FIG. 7 for three forming techniques. As shown here, the cavity pressure reaches the maximum almost at the end of the filling/forming phase, after which the pressure drops with an amount and a rate which is highly dependent upon the employed additional procedure and other process and design parameters such as the percentage of the Sc.F., the material of the sheet or tube blank and the geometry of the deformation. Therefore, the invention can include a control system capable of receiving and analyzing inputs from a pressure measuring device representative of the pressure of the injected resin in the cavity and sending outputs to the injection machine or additional devices to adjust the pressure drop or drop rate in the range that a desired morphology is achievable.

FIG. 7 illustrates the post-gate cavity pressure. Based on the principal of the SFPIF and three major mechanisms presented to control the forming process in this method, preferred embodiments of the present invention are described below in detail. The present invention will become more fully understood from the detailed description of the embodiments given herein below and the accompanying figures which are given as illustration only.

Figure 8:
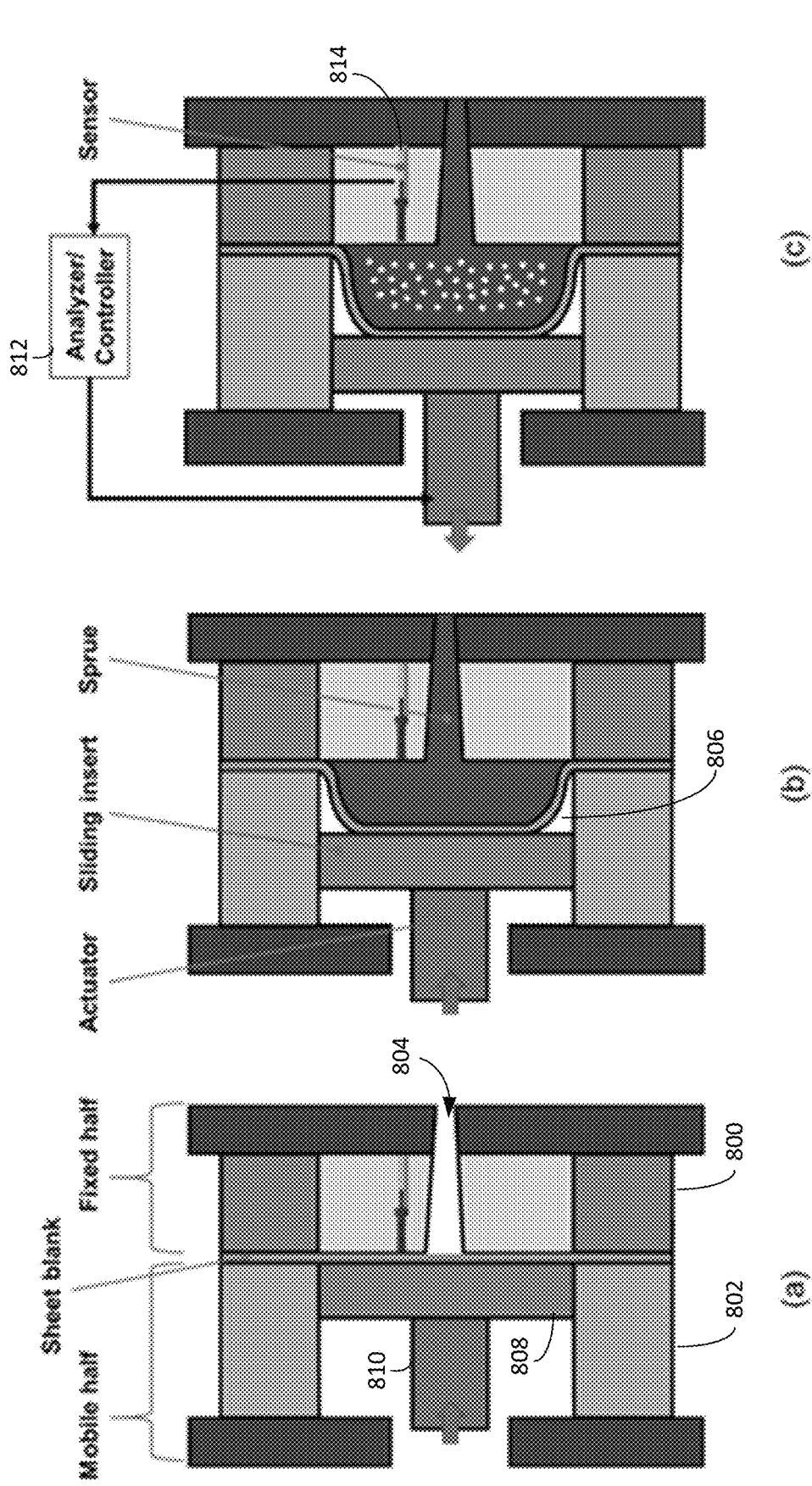
FIG. 8 is a schematic of aspects of the invention.

One embodiment of this system and method is to show how retracting a part of the cavity that is in contact with the sheet blank (single layer or multi-layer made of similar or dissimilar materials) can be used to promote and control the forming process. The mold that can be used in this embodiment is schematically shown in FIG. 8. The mold includes two plate halves: a fixed plate 800 clamped to the stationary plate of the injection machine, and a mobile plate 802 clamped to the movable plate. As shown in FIG. 8, the fixed plate includes a resin flow path 804 for injecting molten resin by the injection mechanism. On the other side, the mobile half houses a cavity 806, the shape of which the sheet is to be deformed. In addition to the fixed plate and mobile plate. The mold can have a blank holder plate which holds the blank in position against the cavity face and assist forming by controlling sheet draw-in. At the mobile plate, there is a sliding insert 808, which forms the bottom of the cavity and is movable by a connected actuator 810. The force applied on the insert by the actuator is controlled by the analyzer/controller system 812 that receives signals from a sensor 814 measuring the pressure of the molten resin. For the sake of briefness, it is only illustrated in (c) of FIG. 8, however, it is existed and functions all duration of the process. The process can consist of three steps. In the first step (a) of FIG. 8, the sheet blank is clamped in between the two plates or by the using a blank holder member. In this stage, the slider is at the most forward position and maintains its contact with the sheet blank. In the second step (b) of FIG. 8, the single-phase resin-gas solution comprising the Sc.F. is then injected into a mold via a suitable system of runners and gates. The melt pressure built up on the side of the sheet opposite to the cavity retracts the sliding insert and forms the sheet into the cavity. The force applied on the sliding insert is maintained in such a way that the pressure of the injected resin is higher than the pressure of the dissolved Sc.F., thus delaying the occurrence of the pressure drop and consequent cell nucleation. In the third step (c) of FIG. 8, which is after the end of the filling/forming phase, the force on the slider is suddenly reversed to move the slider backward. This movement releases the back pressure applied on the sheet and causes further deformation of the sheet. This additional deformation leads to a sudden pressure drop that initiates the nucleation of the bubbles. Sudden pressure drop allows the bubble to form separately and not fuse together. The pressure drop and drop rate can be precisely adjusted by the control system to achieve the desired cell morphology in the injected part after solidification. In addition to the above application, the formability of materials can be enhanced in the presence of a high hydrostatic surface pressure. Hence, the application of the back pressure can also enhance the formability of the sheet and prevent premature rupture. Furthermore, in the case of existing pores or holes on the sheet blank, for example in the case of using fabrics or prepregs as the sheet blank, application of the back pressure can provide a sealing condition on the other side of the sheet blank to prevent penetration of the molten resin during the filling/forming phase. FIG. 8 illustrates the application of back pressure via a solid slider to control the cavity pressure and forming process.

Figure 9:
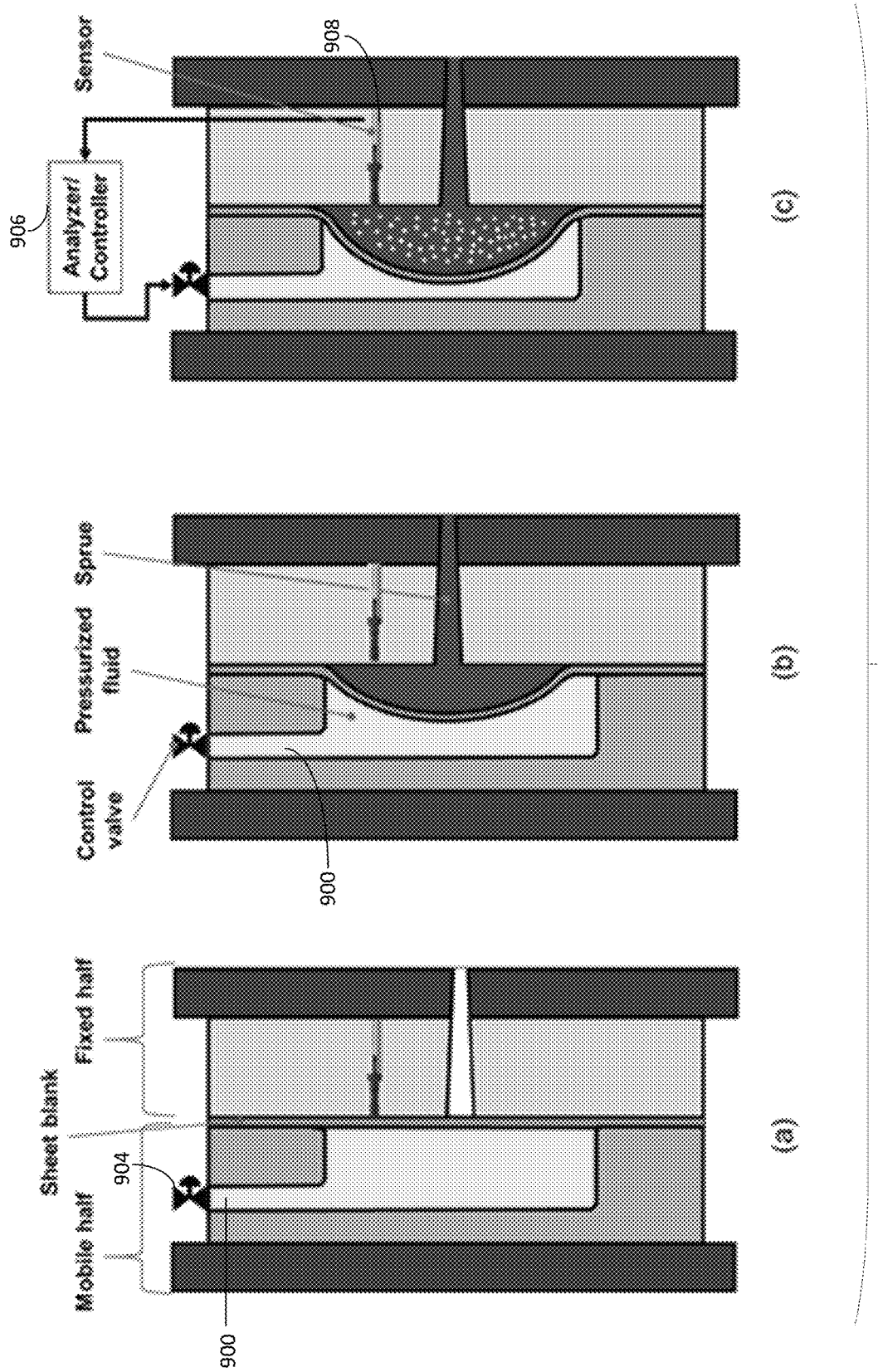
FIG. 9 is a schematic of aspects of the invention.

Referring to FIG. 9, one embodiment of this invention includes pressurized fluid 900 to apply back pressure on the sheet blank and consequently to promote and control the forming process. A mold can be used in one embodiment as shown in FIG. 9. In this embodiment, the other side of the sheet blank, which is not in contact with the polymer melt, is totally or partially supported by the pressurized fluid. As shown in FIG. 9, a narrow passageway 902 is provided at the bottom of the cavity to enter the fluid and maintain the desired pressure through a control valve 904. The back pressure applied on the sheet blank by the mean of the pressurized fluid is then controlled by an analyzer/controller system 906 that receives signals from a sensor 908 measuring the pressure of the molten resin. For the sake of briefness, it is only illustrated in (c) of FIG. 9, however, it is existed and functions in all durations of the process. The process consists of three steps. In the first step (a) of FIG. 9, the sheet blank is clamped in between the two plates or by the mean of a blank holder member to ensure a sufficient sealing at the edge of the sheet blank. In this stage, the pressurized fluid flows into the cavity and fills the cavity to its upper surface while the air is evacuating through an air bleed vent (not shown). In the second step (b) of FIG. 9, the single-phase resin-gas solution comprising the Sc.F. is then injected into a mold via a suitable system of runners and gates. By having pressure on the side of the molten resin higher than the pressure of the fluid on the other side, the sheet blank is stretched and/or drawn into the cavity. The deformation can be stopped with the free forming stage or continued until the sheet is fully formed against the cavity based upon the part design. The pressure of the fluid is maintained in such a way that the pressure of the injected resin is higher than the pressure of the dissolved Sc.F., thus delaying the occurrence of the pressure drop and consequent cell nucleation. In the third step (c) of FIG. 9, which is after the end of the filling/forming phase, the back pressure applied on the sheet is suddenly released by the aid of the control valve and the control system. This sudden termination of the back pressure causes a sudden pressure drop on the melt side that initiates the nucleation of the bubbles. Sudden pressure drop allows the bubbles to form separately and not fuse together. The pressure drop and drop rate can be precisely adjusted by the control system to achieve the desired cell morphology in the injected part after solidification. Similar to the previous embodiment, the back pressure applied by the pressurized fluid can also enhance the formability of the sheet and prevent premature rupture. FIG. 9 illustrates the application of back pressure via pressurized fluid to control the cavity pressure and forming process.

Figure 10:
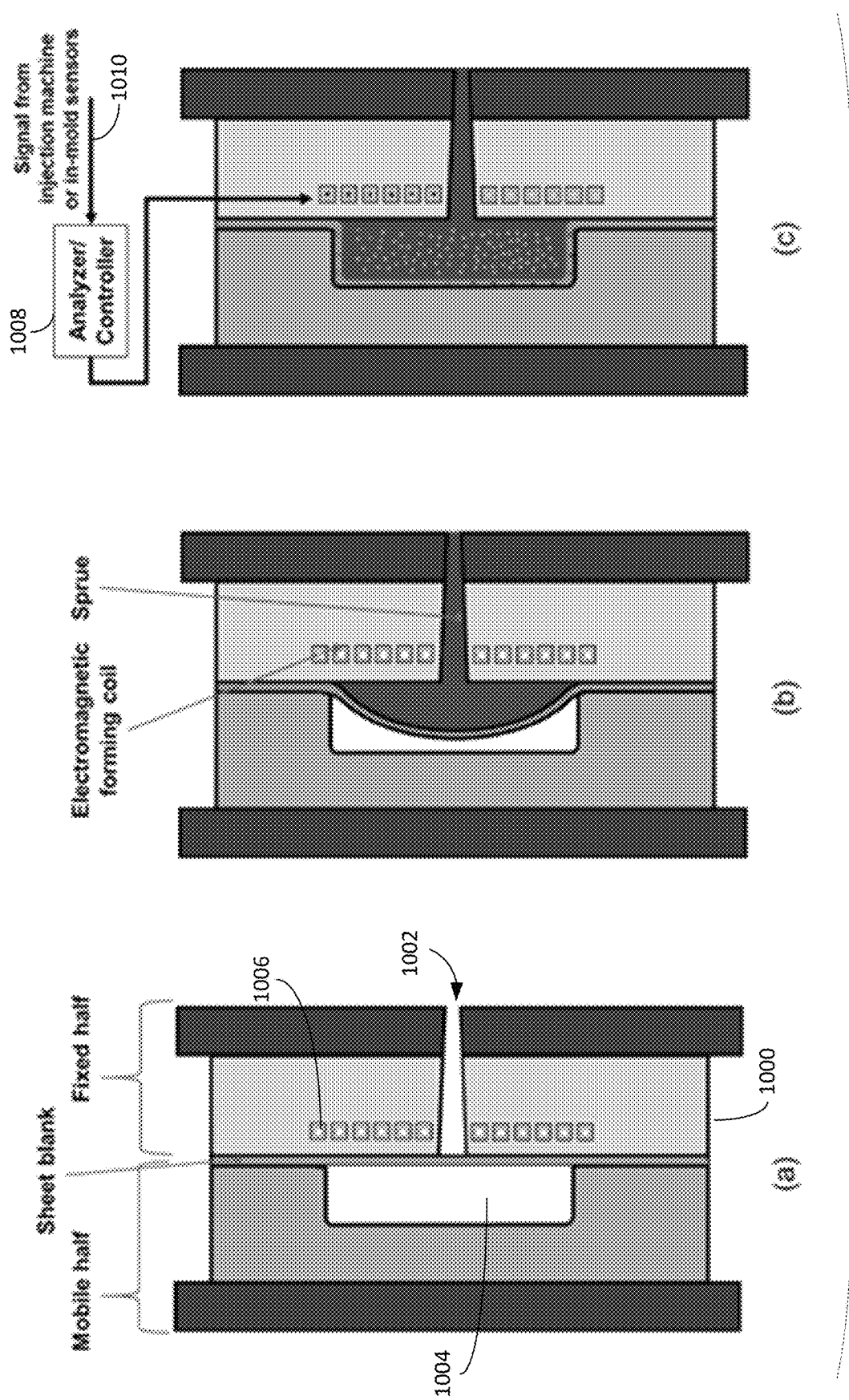
FIG. 10 is a schematic of aspects of the invention.

Referring to FIG. 10, electromagnetic forming technology can be utilized to promote and control the forming process. Electromagnetic forming is a method of forming sheet materials or thin-walled tubes based on the electromagnetic repulsion that can produce very large pressures that can eventually accelerate the workpiece at high velocities (typically 1-200 meters/second). This forming method can be used for a wide range of materials that are sufficiently conductive to exclude the electromagnetic field. The mold used in this embodiment is schematically shown in FIG. 10 FIG. 1. The mold, similar to the other embodiments of this invention, includes two plates: a fixed plate 1000 that houses a resin flow path 1002 for injecting molten resin, and a mobile plate that includes a cavity 1004, the shape of which the sheet is to be deformed. At least one of the mold plates compromises at least one electromagnetic forming coil 1006 to be capable of further forming the sheet blank. The time of actuating the electromagnetic coil and the power of this actuation is controlled by the mean of an analyzer/controller system 1008 that receives instructions 1010 from the injection machine and/or an in-mold sensor. For the sake of briefness, this analyzer/controller system is only illustrated in (c) of FIG. 10, however, it exists and functions in all durations of the process. The process can consist of three steps. In the first step (a) of FIG. 10, the sheet blank is clamped in between the two plates or by the means of a blank holder member. In the second step (b) of FIG. 10, the single-phase resin-gas solution comprising the Sc.F. is then injected into a mold via a suitable system of runners and gates. The melt pressure built up on the side of the sheet opposite to the cavity deforms the sheet by some amount. In the third step (c) of FIG. 10, which is after the end of the filling/forming phase, this pre-formed sheet is then subjected to high rate forming with the electromagnetic coils to complete the forming operation. This high rate deformation leads to a sudden pressure drop that initiates the nucleation of the bubbles. Sudden pressure drop allows the bubbles to form separately and not fuse together. The pressure drop and drop rate can be precisely adjusted by the control system to achieve the desired cell morphology in the injected part after solidification. In addition to the above application, high speed forming via electromagnetic forming can extend the forming limits of several materials due to less influence of localizing effects. Hence, the integration of the SFPIF process and electromagnetic forming technology can further enhance the formability of the sheet and allow deformation of the sharp corners and other difficult-to-form contours. FIG. 1 illustrates the utilization of electromagnetic forming technology to promote the forming process.

Figure 11:
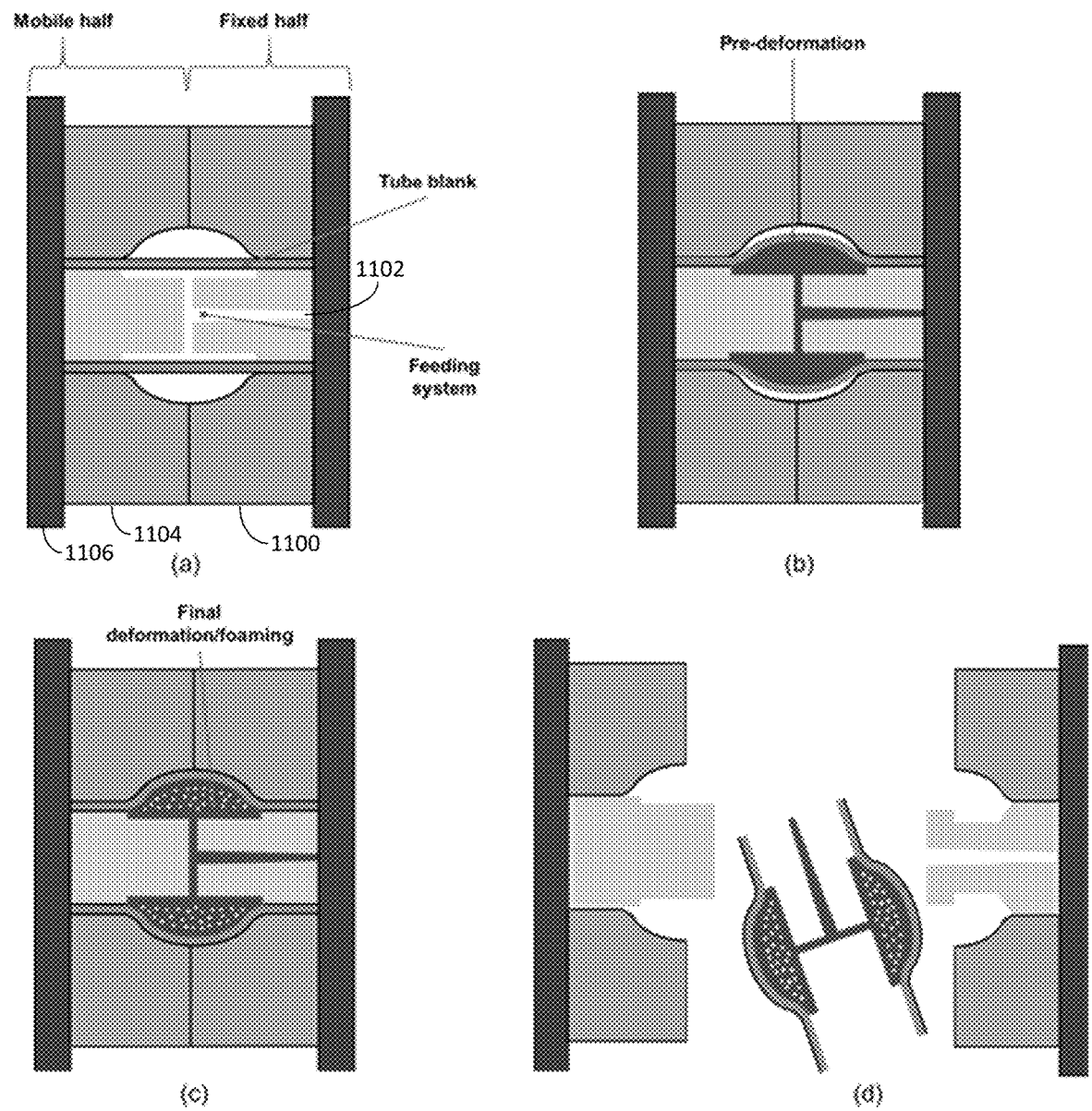
FIG. 11 is a schematic of aspects of the invention.

Another embodiment of the invention is illustrated in FIG. 11. This embodiment shows how it is possible to use a piece of tube-shaped material as the initial blank in SFPIF process. The tube can be single or multi-layer made of metals, polymers, composites, fabrics and any combinations of them, which is, here in this invention, referred to merely as a tube blank. The mold used in this embodiment is schematically shown in FIG. 11. The mold, similar to the other embodiments of this invention, includes two plates: a fixed plate 1100 that includes a feeding system 1102 for injecting molten resin, and a mobile plate 1104 that is clamped to the movable platen 1106. The mold plates are designed in a way that a tube blank can be inserted into and clamped with the mold. The mold also includes features for sealing the open ends of the tube blank. Either mold plate or both can include a cavity of the desired shape against which the tube blank is formed during the process. This process consists of four steps. In the first step (a), the tube blank is inserted into the mold and clamped in between of the two plates or by the mean of a blank holder member. In the second step (b), the single-phase resin-gas solution comprising the Sc.F. is then injected into a mold via a suitable feeding system. The melt pressure built up on the inner side of the tube blank (the melt can also flow on the outer side of the tube depend upon the part design) forms the tube to the cavity by some amount. In the third step (c), which is after the end of the filling/forming phase, this pre-formed tube is then be subjected to the final deformation stage, which can be carried out by the aid of any complementary methods mentioned earlier such as electromagnetic forming process, pressurized fluid or tool movement. This additional deformation leads to a sudden pressure drop that initiates the nucleation of the bubbles. This pressure drop and drop rate can be precisely adjusted by a control system to achieve the desired cell morphology depending upon the utilized complementary technique. In the last step (d) of FIG. 11, after expiration of the cooling time, the mold is opened along the parting line, and the hybrid component is ejected out of the mold.

Figure 12:
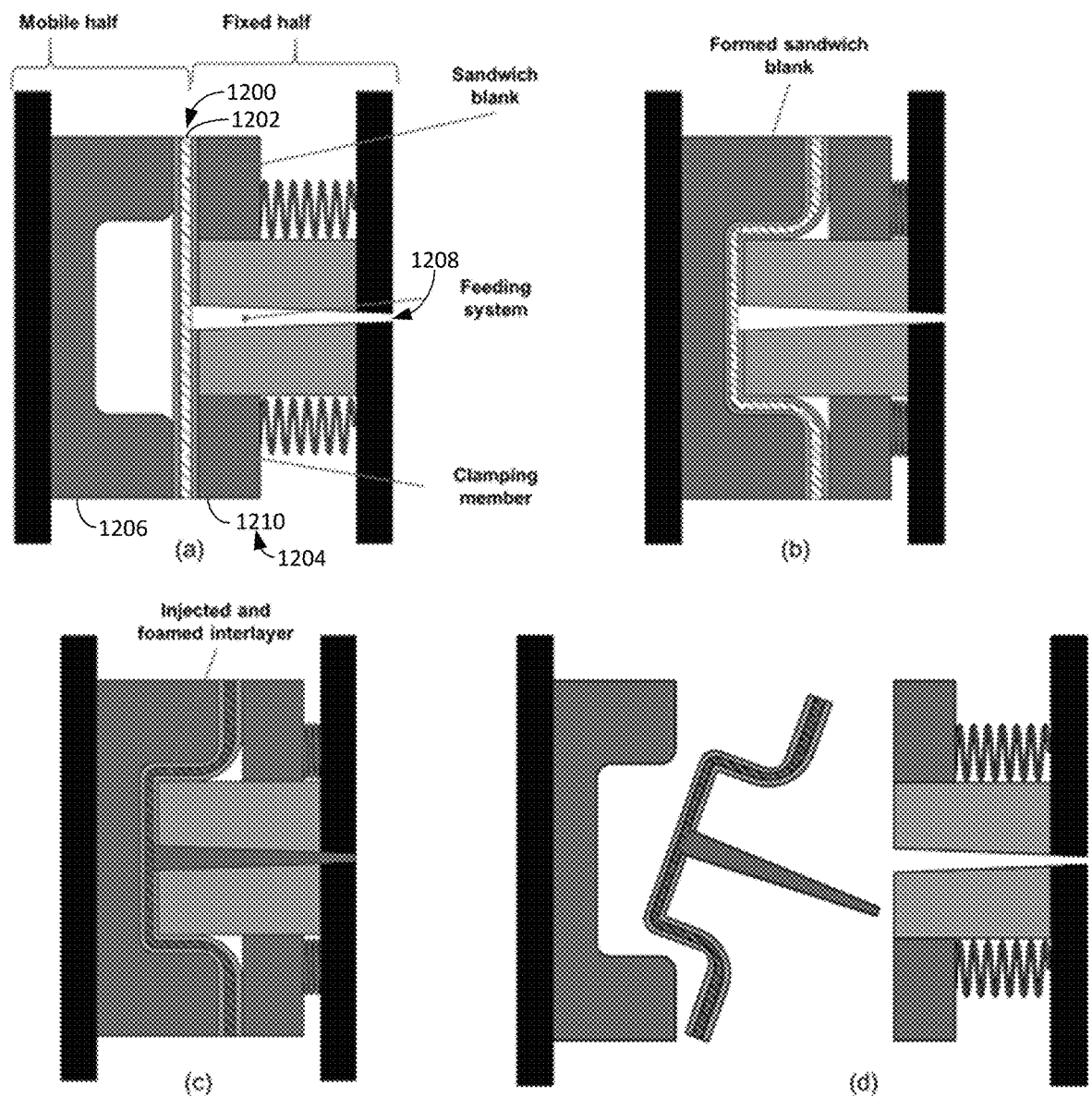
FIG. 12 is a schematic of aspects of the invention.

Another embodiment of the invention is illustrated in FIG. 12. It is presented to show how it is possible to use a multi-layer sandwich 1200 structure as the initial blank in SFPIF process while injecting and forming the resin into its interlayer 1202. The layers of the sandwich blank can be made of metals, polymers, composites or fabrics, which is, here in this invention, referred to merely as a sandwich blank. In one embodiment, the material and thickness of the interlayer are selected to be configured to allow the injection of the resin melt in between the outer layers. The mold used in this embodiment is schematically shown in FIG. 12. The mold, similar to the other embodiments of this invention, includes two plates: a fixed plate 1204, and a mobile plate 1206. The fixed plate can include a feeding system 1208 for injecting molten resin, and a clamping member 1210 to apply a proper BHF during the process. The mobile half that is clamped to the movable plate includes a cavity of the desired shape against which the sandwich blank is formed during the process. This process consists of four steps. In the first step (a), the sandwich blank is placed in between the two halves and clamped by the mean of a blank holder member. In the second step (b) of FIG. 12, while the mold is closing, the sandwich blank is formed by the mean of a solid punch like the conventional deep drawing process. In the third step (c) FIG. 12, the single-phase resin-gas solution comprising the Sc.F. is then injected into the interlayer via a suitable feeding system and a hole on one of the outer layers at the point of contact with the sprue so that the resin melt can be injected into the middle layer. The injection step can be started completely after the deformation step or during the deformation process (not shown here) depending on the design and process parameters. In the latter case, the injection machine must be capable of performing the injection process while the mold is closing. As the polymer melt with dissolved Sc.F. has a lower viscosity than the regular melt, it can be injected into thin interlayers and fill spaces between the fibers. After the end of the injection phase, the forming process is initiated and controlled by the aim of short shot injection, mold opening, and/or any additional deformation caused by the methods mentioned in the previous embodiments. The pressure drop and drop rate occurred during the forming process can also be adjusted by a control system to achieve the desired cell morphology depending upon the utilized forming technique. In the last step (d), after expiration of the cooling time, the mold is opened, and the deformed sandwich-structured component with a foamed interlayer is ejected out of the mold. With this embodiment, a deformed component with a laminated sandwich structure, consisting of a foamed interlayer, can be produced in a one single-shot process. One of the main advantages of this process is the expansion of material selection as the interlayer is injected after deformation of the outer layers thus eliminating the delamination issue caused by the relative displacement between layers. However, any combination of the aforementioned materials can be used in this embodiment, sandwich blanks consist of two outer layers of a metal such as steel or aluminum and an interlayer consisting of fibers such as glass or carbon fibers, are the most common combination due to the superior mechanical, fatigue and thermal properties of their combination. The interlayer fibers can be in the form of a single layer, a stack of several layers and/or a 3D woven fabric. The other advantage of this embodiment is the increase in design flexibility as the interlayer can be injected partially and the interlayer thickness can be varied or have some local features depending on the design of the final part. Moreover, as a soft interlayer in the conventional forming process of the laminated blanks, increases the chance of wrinkling. Another benefit of this process is to reduce the wrinkling issues as the soft interlayer is injected after the deformation process.

Figure 13:
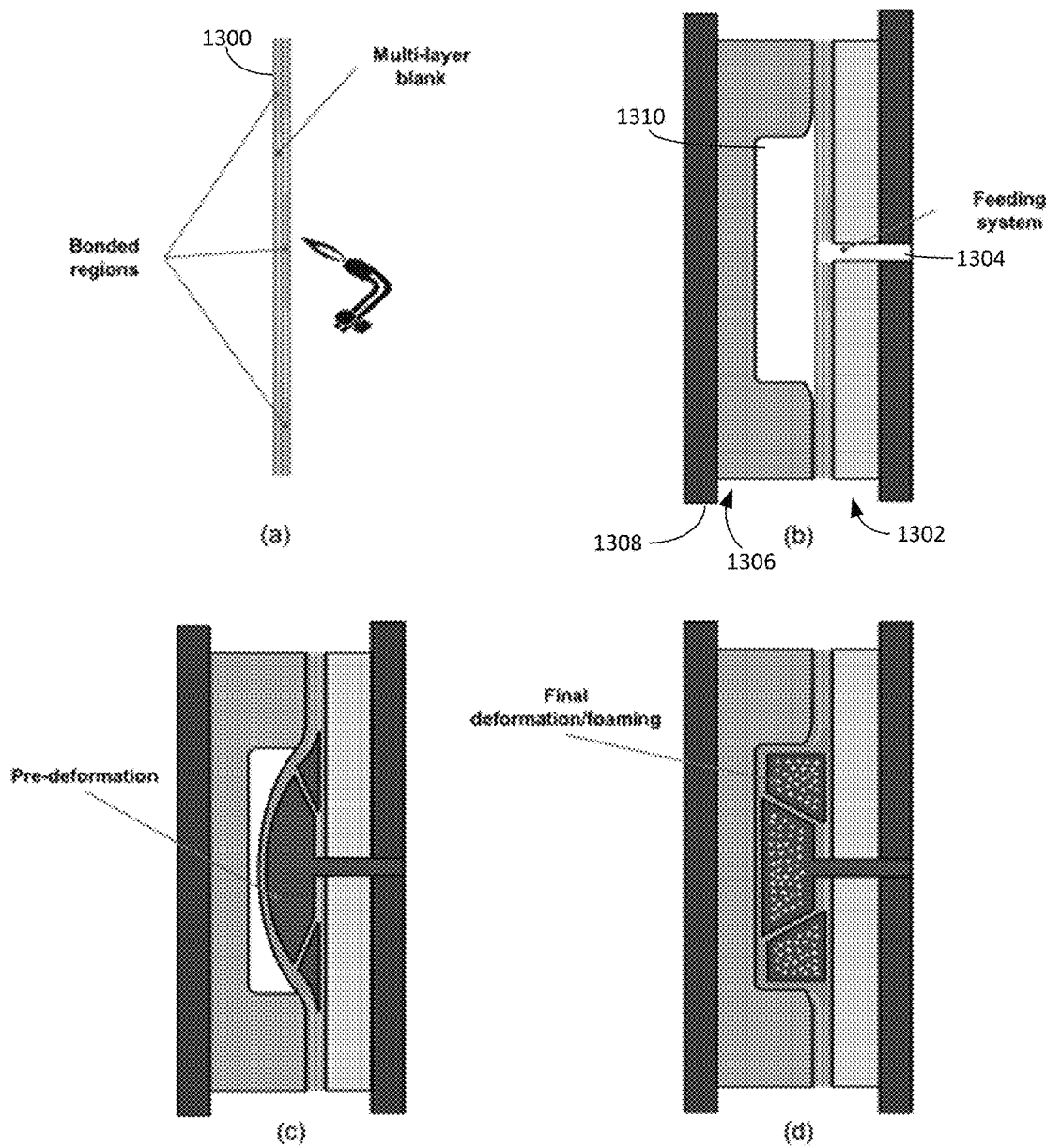
FIG. 13 is a schematic of aspects of the invention.

Another embodiment of the invention is illustrated in FIG. 13. It is presented to show how it is possible to use a stack of sheets that are bonded together at selected areas as the initial blank 1300 in SFPIF process in order to fabricate intricate sandwich structures. The sheets can be made of metals, polymers, composites, fabrics and any combination of them. The number of sheets can vary depending upon the design requirements. The sheets can have the ability to be bonded by such methods as brazing, welding, diffusion or adhesive bonding. The special mold used in this embodiment is schematically shown in FIG. 13. The mold, similar to the other embodiments of this invention, includes two plates: a fixed plate 1302 that houses a resin flow path 1304 for injecting molten resin, and a mobile plate 1306 that is clamped to the movable plate 1308 and includes a cavity 1310 of a desired shape, against which at least one of the sheets is formed during the process. This process consists of four steps. In the first step (a) of FIG. 13, the sheets are bonded together at the selected areas depending upon the design of the final part. This step can be carried out as a completely separate process or as an integrated process with the injection molding process. In the second step (b) of FIG. 13, the stack of sheets is placed into the mold and clamped in between the two plates or by the mean of a blank holder member. In the third step (c) of FIG. 13, the single-phase resin-gas solution comprising the Sc.F. is then injected via a suitable feeding system and a hole on one of the outer layers at the point of contact with the sprue so that the resin melt can be injected into spaces between the sheets. The melt pressure built up in between the sheets forms unbonded areas into the cavity by some amount. In the fourth step (d) of FIG. 13, which is after the end of the filling/forming phase, this pre-formed sandwich structure is then subjected to the final deformation stage, which can be carried out by the aid of any complementary methods mentioned earlier such as electromagnetic forming process, pressurized fluid or tool movement. This additional deformation leads to a sudden pressure drop that initiates the nucleation of the bubbles. This pressure drop and drop rate can be precisely adjusted by a control system to achieve the desired cell morphology depending upon the utilized complementary technique. With this embodiment, an intricate sandwich component consisting of a foamed polymeric core can be produced in one single-shot process. Moreover, as the foamed core is can be completely covered by the facing sheet, it is possible to increase the Sc.F. percentage without any concern about the surface quality thus achieving higher weight reduction. FIG. 13 illustrates using a multi-layer blank with bonded regions for producing intricate sandwich parts.

Figure 14:
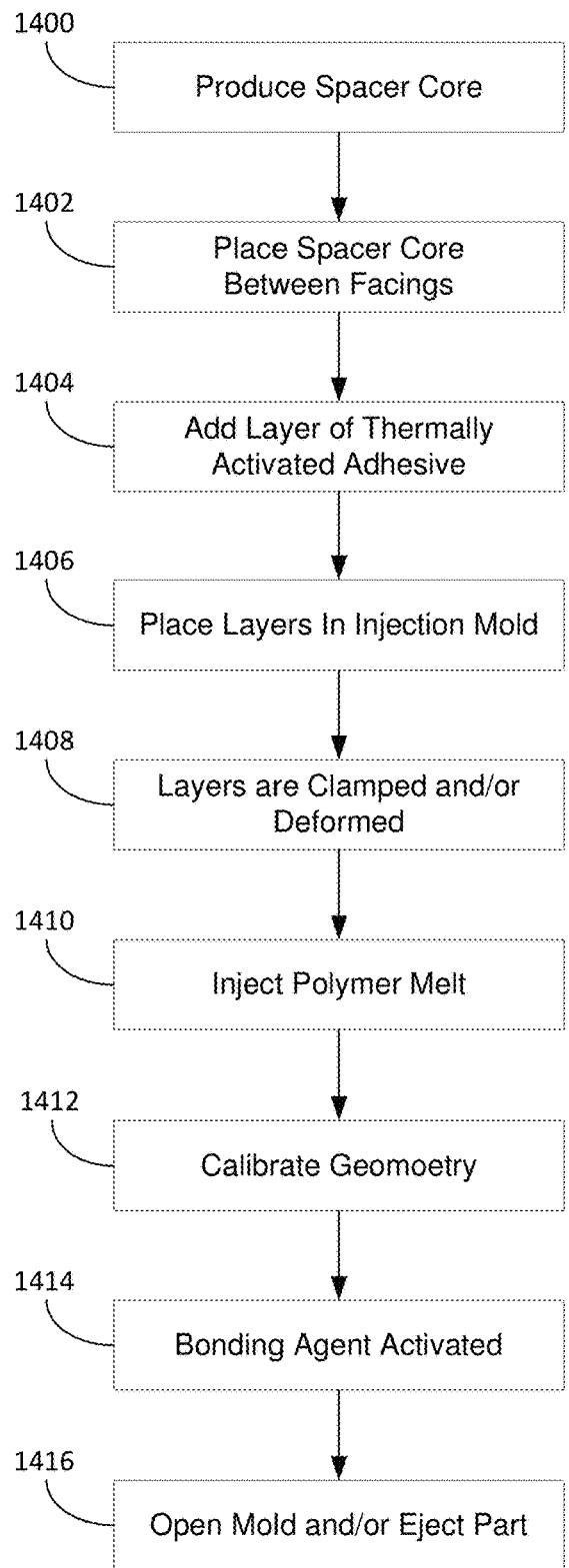
FIG. 14 is a flowchart of aspects of the invention.

Referring to FIG. 14, a three-dimensional sandwich structure can be produced by combining additive manufacturing, deep drawing, and injection molding. A spacer core is produced at 1400. This spacer core can be produced using additive manufacturing and placed in between facings at 1402. A layer of thermally activated adhesive can be placed in between the facings and the spacer core at 1404. The stack of the sandwich layers can be placed in between two plates of an injection molding tool at 1406. When the mold is closed, the sandwich blank is first clamped, then deformed into the cavity by the force of the punch at 1408. After an initial deformation, a polymer melt can be injected through a designated hole on one of the face sheets to fill the free space provided by the spacer core at 1410. During the injection phase, the geometry of the three-dimensional sandwich construction can be calibrated by the melt pressure at 1412. The bonding agent between the layers can be activated by the melt heat at 1414. After the injected melt was solidified, the mold is opened at 1416, and the final three-dimensional sandwich structure is ejected out of the cavity.

This system and method can improve the manufacturing of sandwich structures by reducing the process steps and enhancing product quality. By stacking the layers of the sandwich blank right before the process begins, it provides the maximum design flexibility in terms of selecting sheet materials and configuration of the layers. Injecting the interlayer after the deformation of the sandwich blank reduces or eliminates issues such as delamination, indentation, and wrinkling. As a result, this system and method produce affordable production of 3D sandwich structures thus expanding the use of such structures in many applications. In addition, 3D printing of the spacer core provides opportunities to have more customized properties and functionalities such as structural health monitoring. The injected polymer melt can also be selected from self-healing polymers to induce intrinsic ability to automatically repair damage at the core level or at the face sheets level as a puncture-healing capability. This system and method can assist in reducing maintenance costs while increasing the level of safety.

This system and method add benefits by using a hybrid manufacturing technology that integrates additive manufacturing and deep drawing process that can use polymers and injection-molding.

Figure 15A:
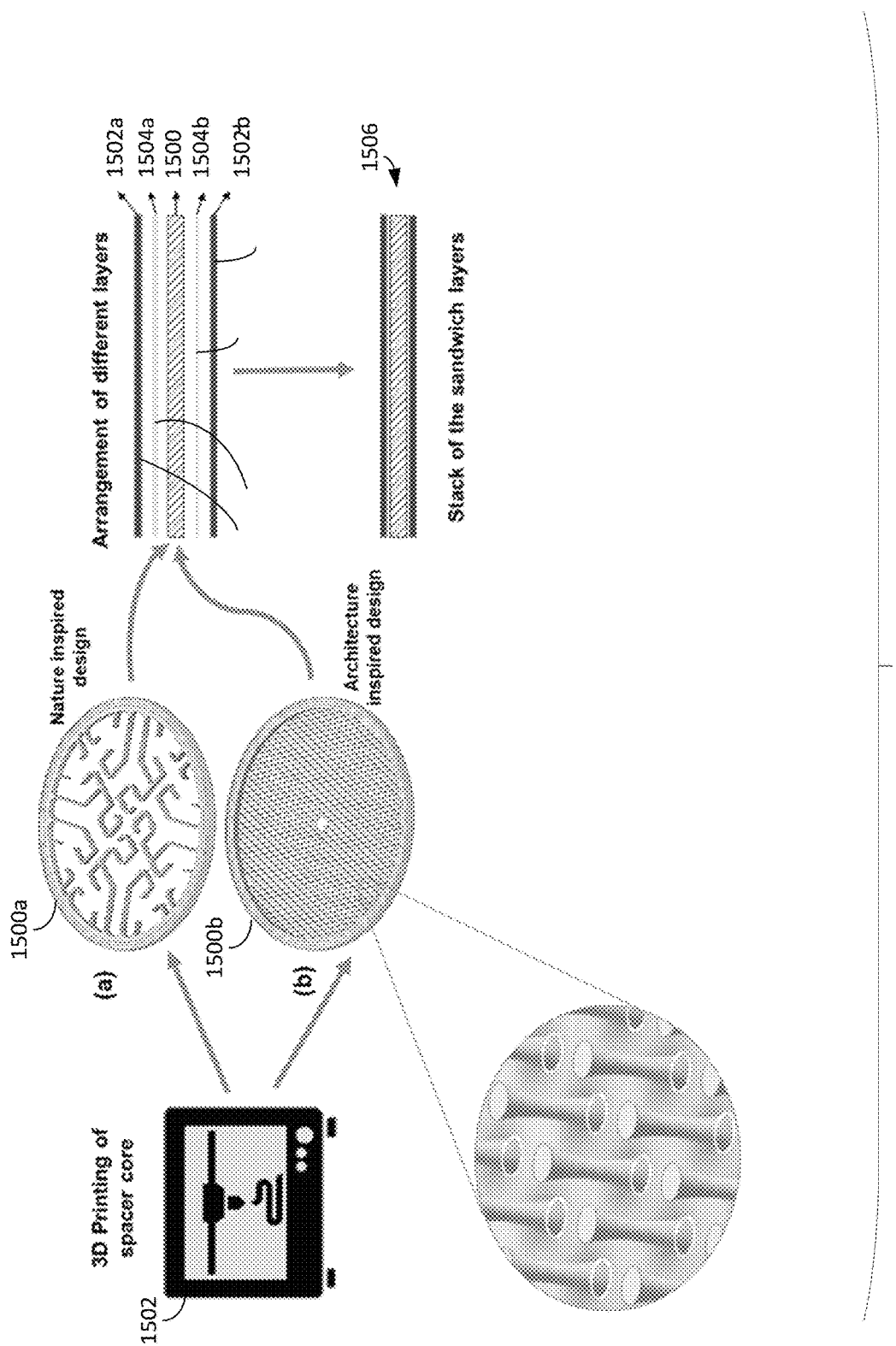
FIG. 15A is a schematic of aspects of the invention.
Figure 15B:
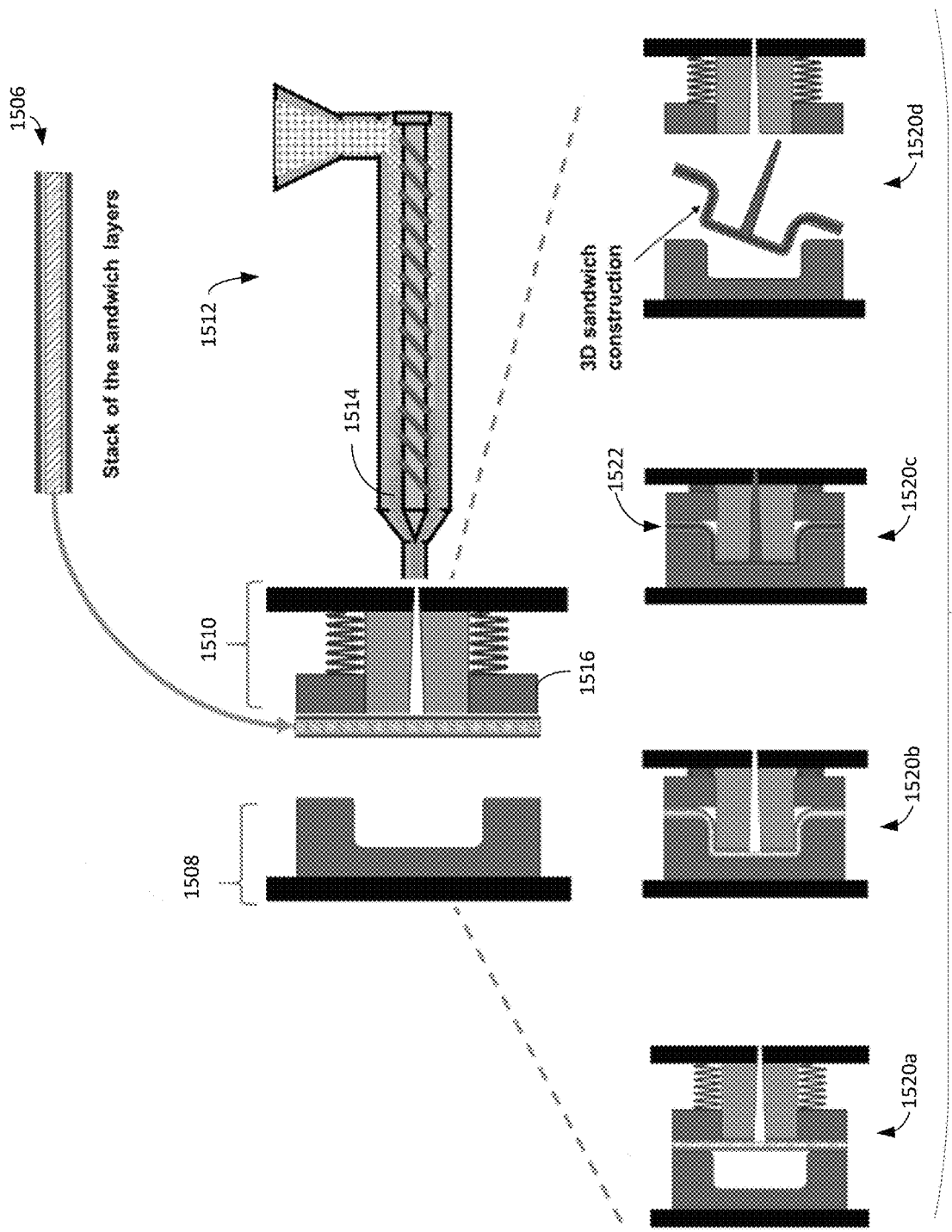
FIG. 15B is a schematic of aspects of the invention; and,
FIG. 16 is a schematic of aspects of the invention.

Referring to FIGS. 15A and 15B, a spacer core 1500a or 1540b is made using an additive manufacturing system 1502. A variety of different designs can be used for the space core 1500 depending upon the desired functionality and geometry of the final 3D sandwich construction. Two examples of the core design are shown as 1500a and 1500b taking inspiration from nature and architecture, respectively. For example, the physical attributes of the spacer core can be inspired from structures created by architects when designing towers, bridges, buildings, and the like. The channels in spacer core 1500a can help maximize the flow of the polymer melt while the spread of biconical pillars in 1500b can assist with and provide structural support. The space core is placed in between a first facing sheet 1502a and a second facing sheet 1502b with a layer 1504a and 1504b of thermally activated adhesive placed respectively in between to provide for a stack of the sandwich layers 1506.

The stack of the sandwich layers 1506 can then be placed in between two plates of a specialized injection molding tool. The tool, similar to a conventional injection molding tool, can include two plates: a fixed plate 1508, and a mobile plate 1510. The fixed plate can include a feeding system 1512 for injecting molten resin 1514, and a clamping member 1516 to apply a proper blank holder force. The design allows for the independent application of the blank holder force from the preset clamping force on the injection molding machine. In one embodiment, the sandwich blank is placed in between the two plates and clamped by the means of a blank holder member at 1520a. At 1520b, while the mold is closing, the sandwich blank can be formed by the means of a solid punch. At 1520c, the polymer melt can be injected into the interlayer space 1522 via a suitable feeding system and a hole on one of the facing sheets at the point of contact with the sprue and/or feeding system. During the injection phase, the geometry of the 3D sandwich construction can be calibrated into the final geometry by means of melt pressure, and the adhesive layer can be activated by the melt heat to bond the injected core to the facing sheets. At 1520d, after expiration of the cooling time, the mold is opened, and the final 3D sandwich structure is ejected out of the cavity.

This system and method add improvement and provides results that were not previously known by stacking the layers of the sandwich blank right before the process to provide increased design flexibility in terms of selecting sheet materials, number of layers, bonding agents and thickness configuration. Further, the injecting of the interlayer after the deformation of the facing sheets reduces or eliminates the delamination issue caused by the relative displacement between layers. Further, the relatively softer interlayer in the conventional forming process of the laminated blanks increases the chance of wrinkling. Another benefit of this system and method is the reduction of the wrinkling issues as the softer interlayer is injected after the initial deformation process.

Further, the spacer core, while maintaining a distance between the facing sheets and allowing the polymer to flow into the interlayer space, can be 3D printing so that additional opportunities to have more customized properties and functionalities are provided. For example, the spacer core can be printed by self-monitoring materials such as carbon fiber-reinforced polymers to form a resistive sensing element which can be used for part of health monitoring. The injected polymer melt can be prepared in varying compositions to optimize desired properties and provide additional functionalities for the resulting sandwich structure. For example, the so-called self-healing polymers can also be used to induce intrinsic ability to automatically repair damage at the core level or at the facing sheets level as a puncture-healing capability. Further, integration of this system and method with supercritical fluid (Sc.F.) assisted injection molding technology can help to inject thinner interlayers or produce larger components as the polymer melt with dissolved Sc.F. has a lower viscosity than the regular melt. Further, the foaming process can also be initiated which resulted in having an interlayer with cellular structure.

Figure 16:
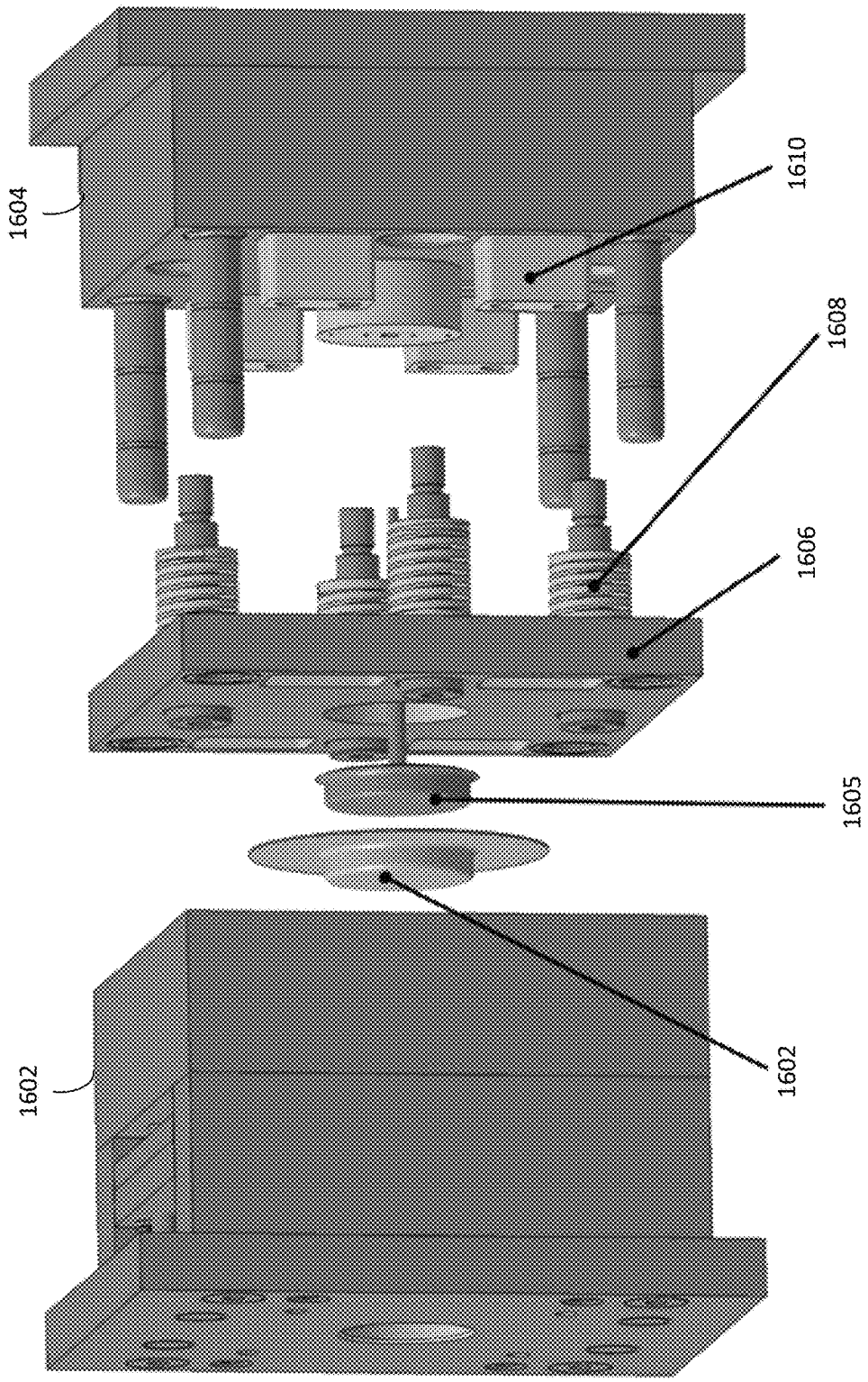

Referring to FIG. 16, one tool that can be used for this system and method is shown. The sheet 1600, after it has been deformed, is shown between the first plate 1602 and the second plate 1604. The polymer 1605 is shown injected between the two plates and adjacent or into the deformed sheet. A blank holder plate 1606 carried spring 1608 and can be received by the second plate and aligned with the bridge 1610 included in the second plate. This embodiment can independently apply blank holder force from the preset clamping force of the molding assembly. The mold can be configured so that the interlayer thickness of the layered component can be adjusted by altering the height of the bridge. The cavity on the second side of the mold can be configured as an adjustable insert to enable variation of deformation depth as a parameter in the geometry of 3D sandwich structures. Using this capability, it is possible to apply a back pressure on the blank during the deformation in order to increase the formability of the stacked blank.

This system and method can improve manufacturing methods and include benefits such as reducing the process steps, enhancing product quality, improving the performance of sandwich structures, increasing the design flexibility and providing additional functionality. Particularly, injecting the interlayer material during or after forming the facing sheets reduces or eliminates disadvantages such as delamination, indentation, and wrinkling. This system and method provide for affordable production of 3D complex geometries which have sandwich structures to replace monolithic parts with applications that include a number of high-performance areas such as automotive and space constrained applications. Using additive manufacturing for making the spacer core with self-monitoring materials and injecting self-healing polymers as the interlayer material can convert the sandwich structure into an intrinsically smart component. This system, method and the resulting companies can reduce maintenance costs with an increased level of safety, attributes important to many industries including automotive, aerospace, construction, oil and gas, and the like. Using the heat and pressure of the injection process can effectively promote the bonding process and save the total time and energy consumption of the manufacturing and production to provide cost-effective manufacturing of smart structures.

The sandwich structures of this system and method can produce self-healing materials. The core layer can include self-healing polymers. When a fault or damage occurs to a face sheet, the core can interface with the face sheet through fillers and additives to seal face sheet cracks and re-bond the face sheet and core regions. By embedding a sensor in one or more of the layers, real-time part monitoring can occur both in-production and in-operation. The sandwich structure can include batteries (e.g. Li-ion) to provide for energy harvesting and storage. In one embodiment, the laminated structure can provide power and perform as a battery or supercapacitor itself. Fibers, core polymers, and facings can also be used to hold a charge to provide what has been termed "massless energy."

The present invention is not limited to the embodiments herein, and various modifications and improvements of the design may be appropriately made without departing from the scope of the present invention based on the basic knowledge of injection molding and metal forming processes.

What is claimed is:

1. A method of forming an article of manufacture comprising the steps of:
   providing a blank;
   securing the blank in a fixed position;
   reforming a shape of the blank by injecting a resin under pressure against a first side of the blank to reform the blank by pressure of the resin against the blank;
   providing a resistance pressure at the blank to counter pressure against the first side of the blank and control shape reformation of the blank;
   whereby the blank is formed into an article of manufacture comprising a foamed material; and,
   wherein the resistance pressure at the blank to control reformation of the blank is provided by applying a fluid pressure against a side of the blank that is opposite the side of the blank against which the resin is injected under pressure.

2. The method of forming an article of manufacture of claim 1, further comprising the step of controlling injection pressure of the resin relative to the resistance pressure at the blank to control shape reformation of the blank.

3. The method of forming an article of manufacture of claim 1, further comprising the step of reducing pressure of the resin to induce formation of the resin as a foam material.

4. The method of forming an article of manufacture of claim 1, wherein the resin comprises supercritical fluid.

5. The method of forming an article of manufacture of claim 1, wherein injection of the resin under pressure forces a portion of the blank into a portion of a cavity of a mold.

6. The method of forming an article of manufacture of claim 1, wherein resistance pressure at the blank to control reformation of the blank is provided by the blank.

7. The method of forming an article of manufacture of claim 1, wherein resistance pressure at the blank to control reformation of the blank is provided by applying fluid pressure using a fluid against a side of the blank that is opposite the side of the blank against which the resin is injected under pressure, wherein the fluid is a liquid.

8. The method of forming an article of manufacture of claim 1, wherein resistance pressure at the blank to control reformation of the blank is provided by applying fluid pressure using a fluid against a side of the blank that is opposite the side of the blank against which the resin is injected under pressure, wherein the fluid is a gas.

9. The method of forming an article of manufacture of claim 1, wherein resistance pressure at the blank to control reformation of the blank is provided by applying hydraulic pressure against a side of the blank that is opposite the side of the blank against which the resin is injected under pressure.

10. The method of forming an article of manufacture of claim 1, wherein resistance pressure at the blank to control reformation of the blank is provided by applying mechanical pressure against a side of the blank that is opposite the side of the blank against which the resin is injected under pressure.

11. The method of forming an article of manufacture of claim 1, wherein resistance pressure at the blank to control reformation of the blank is provided by applying an electromagnetic field.

12. A method of forming an article of manufacture comprising
- providing a blank;
- securing the blank in a fixed position;
- reforming a shape of the blank by injecting a resin under pressure against a first side of the blank to reform the blank by pressure of the resin against the blank;
- providing a resistance pressure at the blank to counter pressure against the first side of the blank and control shape reformation of the blank; and,
- whereby the blank is formed into an article of manufacture comprising a foamed material; and,
- wherein the resistance pressure at the blank to control reformation of the blank is provided by introducing a fluid pressure into a cavity of a mold, wherein the fluid pressure acts against a side of the blank that is opposite the first side of the blank against which the resin is injected under pressure.

13. A method of forming an article of manufacture comprising:
- providing a blank;
- securing the blank in a fixed position;
- reforming a shape of the blank by injecting a resin under pressure against a first side of the blank to reform the blank by pressure of the resin against the blank;
- providing a resistance pressure at the blank to counter pressure against the first side of the blank and control shape reformation of the blank; and,
- whereby the blank is formed into an article of manufacture comprising a foamed material; and,
- wherein the resistance pressure at the blank to control reformation of the blank is provided by the blank, and the blank is formed of metal.

14. The method of forming an article of manufacture of claim 1, wherein the blank is held in fixed position between a first plate and a second plate, wherein the second plate comprises a cavity formed therein, and wherein injection of the resin under pressure forces a portion of the blank into a portion of the cavity.

15. The method of forming an article of manufacture of claim 1, the step of inducing negative pressure to the resin to initiate foaming of the resin.

16. The method of forming an article of manufacture of claim 1, wherein the resin foams to form a foam material, and wherein the resin expands as the foam material forms, and the foam material binds to the article of manufacture.

* * * * *